Sept. 17, 1963 W. K. FRENCH ETAL 3,104,284

TIME DURATION MODIFICATION OF AUDIO WAVEFORMS

Filed Dec. 29, 1961 13 Sheets-Sheet 1

INVENTORS
WALTER K. FRENCH
OLIVER W. JOHNSON, JR

BY Joe L. Koerber
ATTORNEY

Sept. 17, 1963 W. K. FRENCH ETAL 3,104,284

TIME DURATION MODIFICATION OF AUDIO WAVEFORMS

Filed Dec. 29, 1961 13 Sheets-Sheet 5

Sept. 17, 1963 W. K. FRENCH ETAL 3,104,284

TIME DURATION MODIFICATION OF AUDIO WAVEFORMS

Filed Dec. 29, 1961 13 Sheets-Sheet 9

Sept. 17, 1963 W. K. FRENCH ETAL 3,104,284

TIME DURATION MODIFICATION OF AUDIO WAVEFORMS

Filed Dec. 29, 1961 13 Sheets-Sheet 10

FIG. 4

| TIME IN SECONDS | NUMBER OF REGISTERS | SWITCH SETTING | | | | | | | | | | | | | | | | | |
|---|---|---|---|---|---|---|---|---|---|---|---|---|---|---|---|---|---|---|---|
| .01 | 180 | 0 | 0 | 0 | 0 | 0 | 0 | 0 | 0 | 0 | 0 | 1 | 0 | 1 | 1 | 0 | 1 | 0 | 0 |
| .02 | 360 | 0 | 0 | 0 | 0 | 0 | 0 | 0 | 0 | 0 | 1 | 0 | 1 | 1 | 0 | 1 | 0 | 0 | 0 |
| .03 | 540 | 0 | 0 | 0 | 0 | 0 | 0 | 0 | 0 | 1 | 0 | 0 | 0 | 0 | 1 | 1 | 1 | 0 | 0 |
| .04 | 720 | 0 | 0 | 0 | 0 | 0 | 0 | 0 | 0 | 1 | 0 | 1 | 1 | 0 | 1 | 0 | 0 | 0 | 0 |
| 1.0 | 18,000 | 0 | 0 | 0 | 1 | 0 | 0 | 0 | 1 | 1 | 0 | 0 | 1 | 0 | 0 | 1 | 0 | 0 | 0 |
| 2.0 | 36,000 | 0 | 0 | 1 | 0 | 0 | 0 | 1 | 1 | 0 | 0 | 1 | 0 | 0 | 0 | 0 | 1 | 1 | 0 |
| 3.0 | 54,000 | 0 | 0 | 1 | 1 | 0 | 1 | 0 | 0 | 1 | 0 | 1 | 1 | 0 | 0 | 1 | 1 | 1 | 0 |
| 3.5 | 63,000 | 0 | 0 | 1 | 1 | 1 | 1 | 0 | 1 | 0 | 1 | 1 | 1 | 1 | 1 | 1 | 0 | 1 | 0 |
| 13.0 | 234,000 | 1 | 1 | 1 | 0 | 0 | 1 | 0 | 0 | 0 | 1 | 1 | 1 | 0 | 1 | 0 | 1 | 1 | 0 |
| 13.5 | 243,000 | 1 | 1 | 1 | 0 | 1 | 1 | 0 | 1 | 0 | 0 | 1 | 1 | 1 | 1 | 1 | 0 | 1 | 0 |
| 14.0 | 252,000 | 1 | 1 | 1 | 1 | 0 | 1 | 0 | 1 | 1 | 1 | 1 | 0 | 0 | 1 | 1 | 0 | 0 | 0 |

TIME DURATION MODIFICATION OF AUDIO WAVEFORMS

United States Patent Office 3,104,284

Patented Sept. 17, 1963

3,104,284

TIME DURATION MODIFICATION OF AUDIO WAVEFORMS

Walter K. French, Montrose, and Oliver W. Johnson, Jr., Poughkeepsie, N.Y., assignors to International Business Machines Corporation, New York, N.Y., a corporation of New York Filed Dec. 29, 1961, Ser. No. 163,247
19 Claims. (Cl. 179—15.55)

This invention relates to the modification of the time duration of an audible waveform and more particularly to the expansion or compression of a voiced audio waveform to fit within predetermined time boundaries or to expand or compress the waveform by a predetermined ratio, while preserving the intelligibility and quality of the information contained in the waveform.

In the prior art there are two general methods of speeding up (time compressing) a recorded sample of speech: (1) by increasing the speed of playback which raises all frequencies by an amount equal to the ratio of the speed-up, and (2) by sampling in short segments and reassembling only a portion of the segments. In the second method, a chopping technique may be used to remove some of the short sample segments. If the gaps in the recorded speech are removed, an increase in the speech rate with no great loss in intelligibility, for small chops, may result. This latter method does not have the disadvantage of shifting the frequency of the speech spectrum with acceleration.

Such a chopping technique has been used to either expand or compress an audio waveform by indiscriminately chopping out or duplicating portions of the waveform to expand or compress the audio waveform to a desired length. The sound produced from a waveform which has had indiscriminately selected portions chopped out or duplicated is of poor quality.

The pitch of a speech sound is determined by the behavior of the vocal cords, which are more accurately described as vocal folds because of the anatomic structure. Whenever a voiced sound is uttered, the vocal folds move together and then apart in such a manner as to vary the size of the opening between them. This opening is referred to as the glottis. For a constant pitch, the vocal folds move together and separate at regular intervals. During a portion of each cycle the glottis is completely closed and the supply of air from the lungs causes a rise in pressure which reaches a maximum at this time. When the glottis opens, there is an explosive burst of air which relieves the pressure. The time interval between these bursts determines the fundamental pitch or frequency. The time interval between the pulses, that is, the pulse period, is the reciprocal of the pitch.

Actually, an acoustical network is interposed between the glottis and the free air. This network serves to modify the nature of the flow by superimposing higher frequencies thereon, but does not modify the pitch. As described, energy flow for producing the voiced sounds comes in explosive bursts and, in a stretching process where the speed of playback is changed, it is inescapable that the time interval between these bursts will be changed. Thus, the resulting pitch is changed proportional.

It is a characteristic of a periodic wave, no matter how complex that, after a certain time interval known as the period, its form is a repetition of what has gone before. In the case of an exactly periodic wave, the repetition is exact. In the case of a nearly periodic wave (and syllabic rates in speech are so slow compared with voice frequencies of interest that every voiced speech wave is periodic or nearly periodic) the repetition is inexact and approximate, but nevertheless easily recognized. References, hereinafter and in the appended claims, to periodicity of speech is intended to refer to the actual periodicity of speech; that is, to recognize that speech consists of approximately periodic portions as well as non-periodic portions, the latter of which are processed by the system as though they were as periodic as the former portions.

In the appended claims the term audio data or audio input is intended to include input data which are periodic (or approximately periodic) in its entirety, or which are partly periodic (or approximately periodic) and partly non-periodic.

In the present invention the individual pulse periods are determined and are duplicated or omitted as units. In the indiscriminate chopping technique of the prior art, the chopping is done without regard to the individual pulse periods and thus results in chopping out or duplicating portions of pulse periods. Thus, the fundamental frequency of the modified waveform is disturbed and the sound reproduced from the reconstructed waveform is of poor quality and intelligibility.

Accordingly, it is a primary object of this invention to provide improved apparatus for expanding or compressing audio waveforms.

It is another object of this invention to provide apparatus for expanding or compressing an audio waveform by discriminately deleting or duplicating portions of the waveform which correspond to pulse periods of the fundamental glottal frequency of the speaker.

Still another object of this invention is to provide apparatus for expanding or compressing an audio waveform to coincide with a predetermined time period.

Another object of this invention is to provide apparatus for compressing or expanding an audio waveform where the waveform is to be compressed or expanded in accordance with a predetermined ratio.

Yet another object of this invention is to provide apparatus for expanding or compressing an audio waveform in accordance with a predetermined ratio wherein the audio waveform is expanded by duplicating certain portions thereof and is compressed by deleting selected portions thereof wherein the ratio of the modified waveform to the original waveform is compared progressively during modification with the desired ratio of expansion or compression.

The foregoing and other objects, features and advantages of the invention will be apparent from the following more particular description of a preferred embodiment of the invention, as illustrated in the accompanying drawings.

FIGURES 3*a*–3*h* form a composite circuit schematic of the system.

FIGURE 4 is a conversion chart.

Figures 5, 5A:
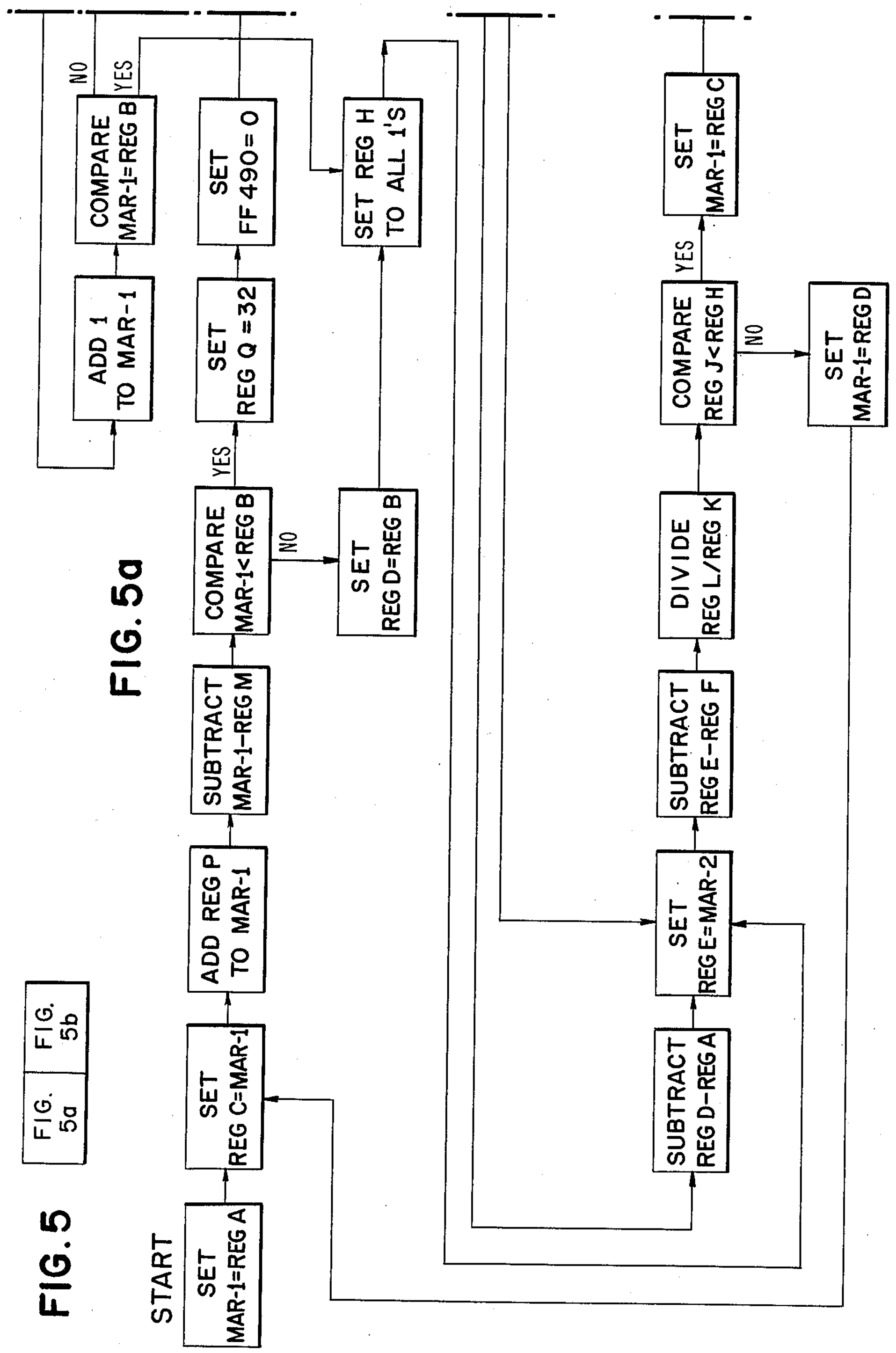
Figure 5B:
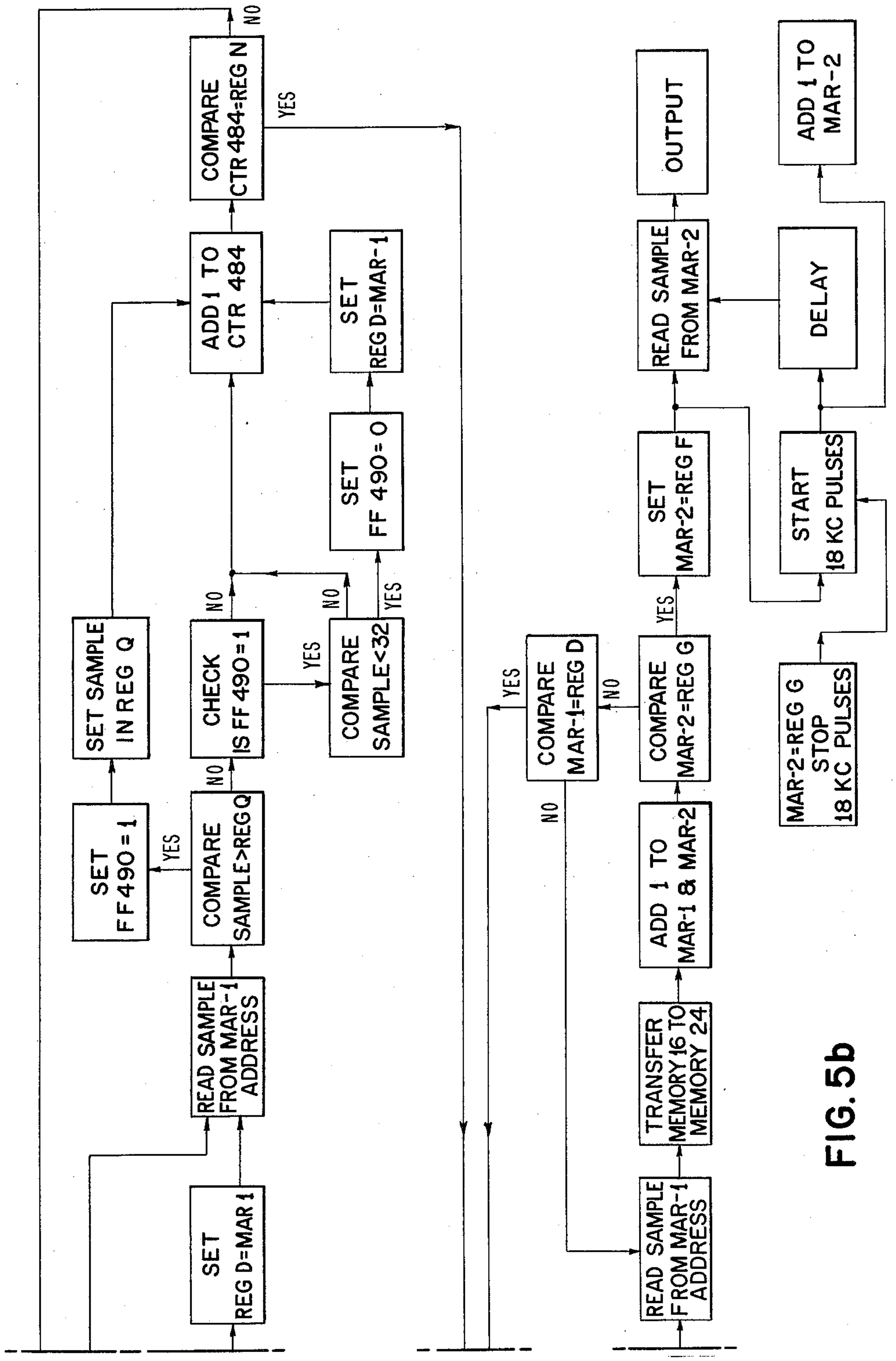

FIGURE 5 shows the arrangement of FIGURES 5*a* and 5*b*.

FIGURES 5*a* and 5*b* together form a processing flow chart for the system.

Figure 1:
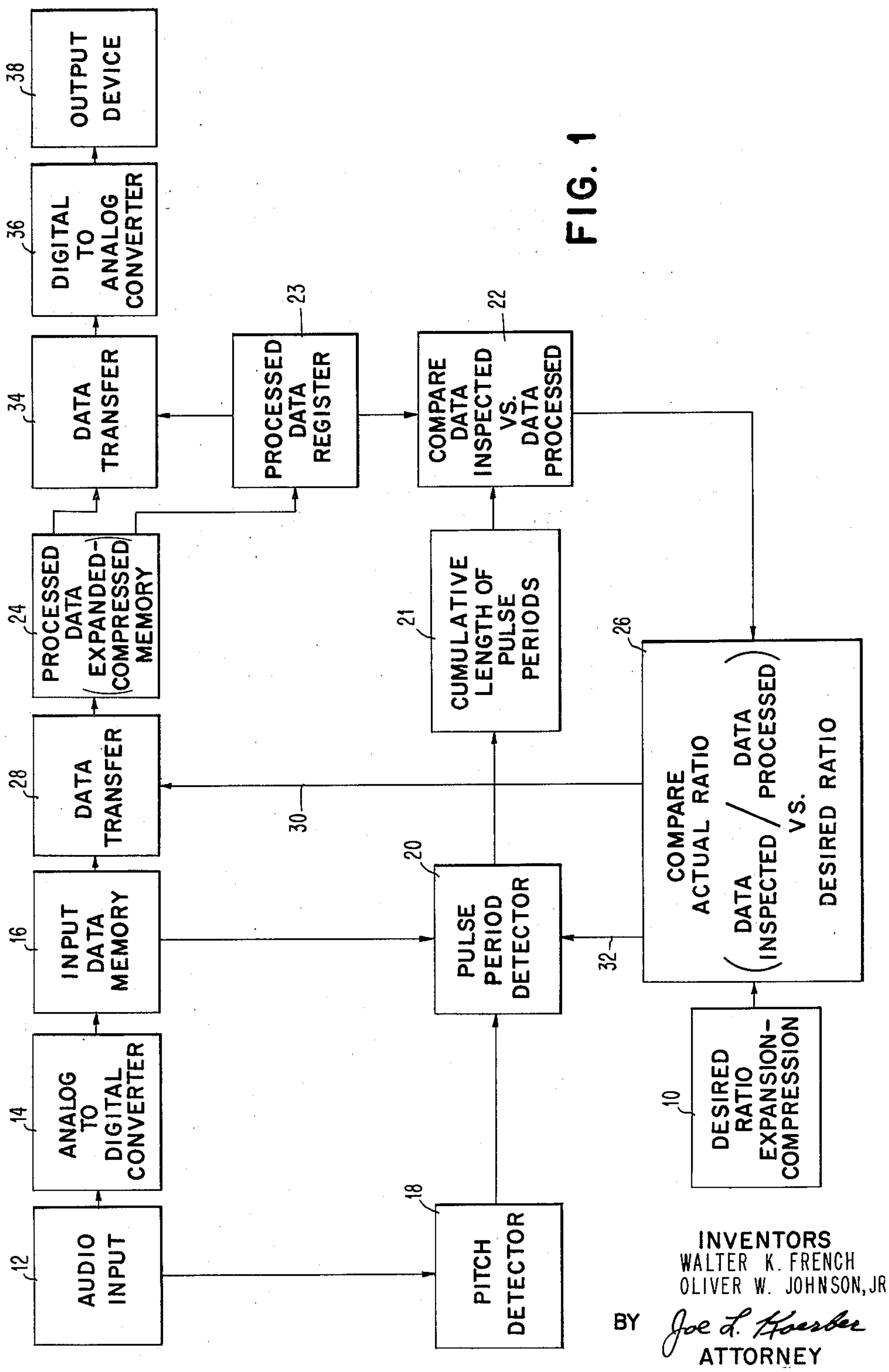
FIGURE 1 is a block schematic of the system.

Referring to FIGURE 1, a general schematic of the circuit is shown in block form. Due to the complexity of the circuit, this schematic illustration does not attempt to show all the interconnections of the various circuit blocks, but rather is intended merely as a general functional description of the system. The basic units of the system are an audio input unit, a first or input data memory, a second or processed (compressed/expanded) data memory, an output unit, and a circuit for specifying or calculating the desired compression/expansion ratio.

Prior to introduction of the first audio data, the desired time duration or the compression/expansion ratio is set up in a block 10. An audio input to a block 12 is applied to an analog-to-digital conversion block 14 which digitizes the input and stores it in an input data memory block 16. An output from the block 12 also is applied to a pitch detector block 18 which detects the fundamental or glottal frequency of the particular speaker's voice.

A pulse period detector 20, in conjunction with the output of the pitch detector 18 effects the interrogation of a selected group of storage positions in the memory 16 and determines the end of a first fundamental pulse period. The cumulative number of memory 16 registers in the pulse periods determined is stored in a register 21. In a block 22, the number in register 21 is compared with a number in a register 23 which stores the number of memory registers used in a memory 24 which contains the expanded or compressed data. The actual ratio thus determined is compared, in a block 26, with the desired ratio previously set up in block 10. The comparison between these two ratios determines whether the last determined pulse period of data in memory 16 will be transferred through a transfer block 28 to memory 24.

The pulse periods of the digitized audio data in memory 16 are individually determined by the circuit 20 and a decision is made with respect to each such pulse period, based upon the comparison of the actual ratio and the desired ratio, whether that particular pulse period of data will be (1) transferred from memory 16 to the memory 24; (2) transferred more than once from the memory 16 to the memory 24 thus duplicating or expanding the input data; or (3) deleted, that is, not transferred at all from the memory 16 to the memory 24, thus compressing the input data.

When data are to be transferred from memory 16 to memory 24, an output from the compare circuit 26 is applied through a path 30 to the transfer circuit 28.

When data are not to be transferred, an output from compare circuit 26 is applied through a path 32 to the pulse period detector circuit to initiate determination of the next pulse period.

When all the input data in the memory 16 have been processed and appropriate portions thereof have been transferred to the memory 24, the now expanded or compressed data in the memory 24 may be read out. A signal is applied from the processed data block 23 to a data transfer circuit 34 to effect read out, through a digital-to-analog conversion block 36, to an output block 38. This output block may be an audio output or a recorded output.

Except for blocks 16 and 24, the blocks in FIGURE 1 are not referred to by those numbers in the following description.

Each of the individual circuit components in this system is well known and, therefore, with one or two exceptions, will not be described. The components referred to consist primarily of flip-flops, inverters, pulse generators (short duration single shots), gate circuits (AND, OR), delay circuits, decoders (emitters), comparison circuits, dividers, multipliers, analog-to-digital converters, digital-to-analog converters, energy threshold detectors, and conventional core memories having memory buffer registers, memory address registers, read and write status controls and other conventional memory controls.

Memory 16 is a 256×256×6 core memory and thus has a capacity to store 65,536 six-bit samples. At the specified 18 kilocycle (kc.) sample rate, slightly more than 3.5 seconds of input data may be stored. This memory requires a sixteen-bit address.

Memory 24 is a 512×512×6 core memory and thus has a capacity to store 262,144 six-bit samples. At the 18 kc. sample rate, slightly more than 14.5 seconds of processed data may be stored. Thus, in the embodiment described herein, the maximum expansion rate is approximately four. Memory 24 requires an eighteen-bit address. Obviously the capacity of either or both memories could be increased as desired.

Figure 2:
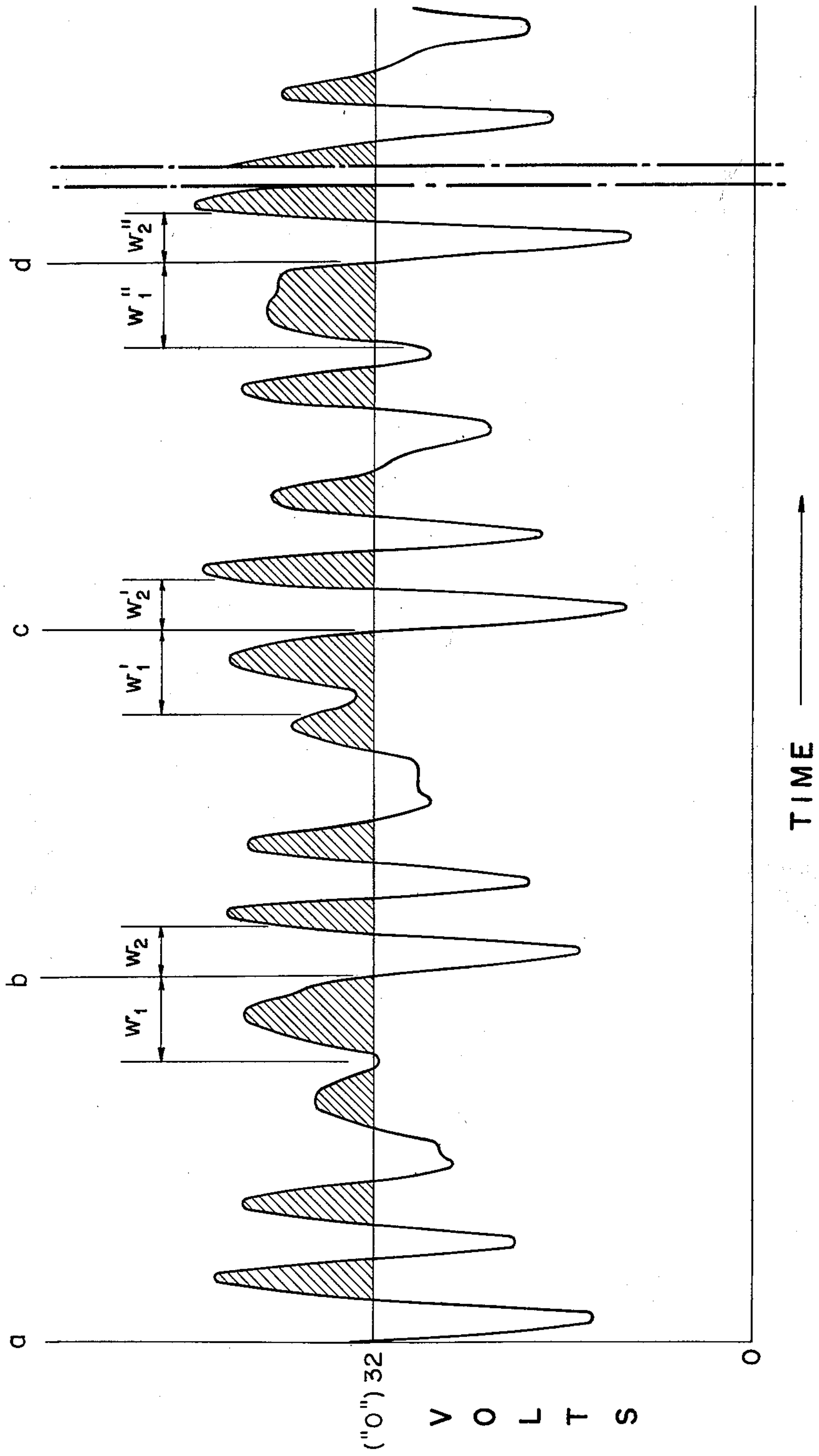
FIGURE 2 is a partial analog input waveform.

Referring to FIGURE 2, a sample waveform is shown plotted along a horizontal axis representative of time and a vertical axis representative of voltages. While the curve is shown as being continuous, in actuality, it is an envelope formed by connecting discrete samples taken from an electrical analog representation of an audio input waveform at an 18 kc. sample rate.

The range of voltages is adjusted to fall within the range 0 to 64 volts. However, it is desired to raise the "0" plane to the 32 volt level whereby equal variations above and below the "0" plane may be obtained. Thus the lower unshaded portion of the waveform is 0 to 32 volts whereas the upper shaded portion is in excess of 32 volts.

In accordance with the previous description of the fundamental or glottal frequency, and by examination of the vertical lines *a*, *b*, *c*, etc. on FIGURE 2, the fundamental pulse periods are apparent. Thus, the waveform between the lines *a* and *b* is almost the same as the waveform between the points *b* and *c* and between the points *c* and *d*. For each voiced sound, there is a multiplicity of these fundamental pulse periods which are so nearly the same and there is a sufficient number of them that the duplication of one or more of them or the exclusion of one or more of them will have little or no effect on the final audio sound which is reproduced from the processed, digitized data. Thus, to compress a given audio waveform, certain of the pulse periods are omitted. If the audio waveform is to be expanded, certain pulse periods are duplicated two or more times depending upon the desired expansion ratio. By discriminately duplicating or excluding entire pulse periods of the waveform as units, a final waveform is obtained which is far superior to one obtained by indiscriminately chopping sections of the waveform or duplicating sections of the waveform without regard to the beginnings and ends of the pulse periods.

However, even though, for a given voiced sound, a first pulse period is initiated by a first opening of the glottis and is followed by other approximately periodic pulses, it is not essential, in the present invention, that the actual beginning of this first pulse period be used as a starting point. The requirement is that, having selected a particular starting point in a pulse period, subsequent pulse periods are considered as starting at corresponding points. Thus, the "periods" of data processed are defined by selection of the first starting point and are duplicated or omitted as units.

The length of all pulse periods for a particular speaker's voice are approximately the same and therefore, by determining the length of one or more of these pulse periods and by applying a factor proportional to the sample rate, an estimate may be made of the number of addresses in memory 16 required to store a single pulse period. By examining the data recorded at a number of addresses on either side of the estimated end address, the exact end address may be determined. To facilitate this examination, a "search window" is opened up extending on either side of the estimated end of a pulse period address, lines *b*, *c*, *d*, etc. and data at all addresses within the window are interrogated to determine which address contains the actual end of pulse period data. These windows are defined in FIGURE 2 by lines $W_1$—$W_2$, $W_1'$—$W_2'$, $W_1''$—$W_2''$, etc.

After the approximate period of the speaker's voice is determined, the system operates as effectively on non-periodic, for example, fricative portions of the audio data, as on the periodic portions. Since the approximate period length and the search window limits have been established, the zero crossing following the highest peak value is detected without regard to whether the waveform at the point under examination is periodic or nonperiodic.

The system includes a number of data registers having alphabetic designations. Each of these registers is a multiple order register capable of storing values in binary form. Each of these registers is of the type which has available at each of its outputs at all times a voltage level designated either 0 or 1, depending upon the state of each particular order of the register. Each order of a register could be, for example, a flip-flop circuit having On and Off outputs.

Register A is a sixteen-bit register which stores the original start location of data entered into the input data memory 16. This value once established for a particular audio input always remains the same. Register B is a sixteen-bit register which stores the next address after the last stored data of the digitized input data in the memory 16. This address probably will change with each new input of digitized data. Register C is a sixteen-bit register which always store the start address of the pulse period to be processed. Initially, for the first pulse period, Register C stores the same address as Register A but, after processing the first pulse period of data, the addresses in Registers C and A differ. Register D is a sixteen-bit register which stores the first address following the end of the pulse period being processed. That is, Register C stores the start address of the pulse period being processed and Register D stores the first address following the end of that pulse period.

Register E is an eighteen-bit register associated with the second memory 24 and stores the address which is currently in the memory address register (MAR–2) of the memory 24. Thus, the address in Register E is kept current with the address in MAR–2. Register F is an eighteen-bit register, also associated with the second memory 24, and stores the address at which the data in memory 24 starts.

Register G is an eighteen-bit register associated with the circuit which specifies the desired ratio of expansion or compression and stores the address at which the data in memory 24 shall end in accordance with the specified modification. Register H is a nine-bit register associated with the same circuit and stores a number representative of the desired compression/expansion ratio.

Register K is a sixteen-bit register which stores a number indicative of the accumulative number of registers of data from memory 16 which are included in the pulse periods which have been determined; that is, the difference between the address in Register D and the address in Register A. Register L is an eighteen-bit register which stores the difference between the addresses in Registers E and F; in other words, the difference between the last used address in memory 24 and the first used address in memory 24. Register J is a nine-bit register which stores the ratio of the number of addresses used in memory 24 to the accumulative number of addresses from Register K or in other words, the value in Register L is divided by the value in Register K.

Register M is a six-bit register which stores a number representing the number of address positions of memory 16 which will be examined preceding the estimated end of a pulse period. The beginning of search window address $W_1$ is determined by subtracting the Register M value from the Register D value. Register N is a seven-bit register which stores a number equal to the total number of address positions which are included in the search window. Register P is a nine-bit register which stores a number equal to the approximate number of memory registers required to store one pulse period of the audio input for the particular speaker's voice. Other registers will be described as they are reached in the description.

Having determined the pulse period of the speaker's voice, the address of line *b*, approximating the end of the first pulse period, is determined. Thereafter a window is opened up to the line $W_1$ preceding line *b*. Thereafter the data in all memory buffer registers of memory 16 between the addresses $W_1$ and $W_2$ are interrogated looking for a positive maximum value followed by a "0" crossing. The next address following each "0" crossing following a positive peak is determined. If more than one positive peak is found in a window $W_1$—$W_2$, the address following the "0" crossing which follows the most positive of the peak values stands in Register D after the entire window has been scanned and defines the actual end of pulse period.

Having determined the actual end of the pulse period, the number of registers between the address of starting line *a* and the address of the end of the pulse period (approximately line *b* for the first pulse period) is compared with the total number of registers which have been used in memory 24. This comparison gives the ratio between the number of registers of input data examined and the number of registers used in the memory 24. In accordance with a comparison of this ratio with the desired ratio, the data corresponding to the pulse period last examined are either copied into memory 24, or omitted therefrom. If the pulse period data are copied, the ratio comparison is again made and again a decision is made to copy or not to copy. A decision not to copy initiates the determination of the end of the next pulse period.

After the second pulse period end address, approximately line *c*, has been determined, the number of registers between the starting line *a* and the end of pulse period two is compared with the number of addresses used in memory 24. Thus it is seen that the ratio is checked following the determination of the end of each successive pulse period and following each transfer of data to memory 24, whereby the desired ratio may be maintained very closely throughout the entire examination and transfer of data from memory 16 to memory 24.

After all data have been processed and the desired compression or expansion has been achieved, the processed data are read out of memory 24.

In the drawings, where multiple lines are required, a single line is shown having a circle with a number designating the number of lines. Where a single line is required the circle and number designation are not used. Where a number of lines enter a circuit such as an AND gate and the same number of lines emerge therefrom, it will be understood that the schematic circuit represents that number of AND gates.

Referring to FIGURE 5, a flow chart is shown indicating the steps in the processing (expansion/compression) of data which are stored in memory 16.

*Input*

Figures 3, 3A:
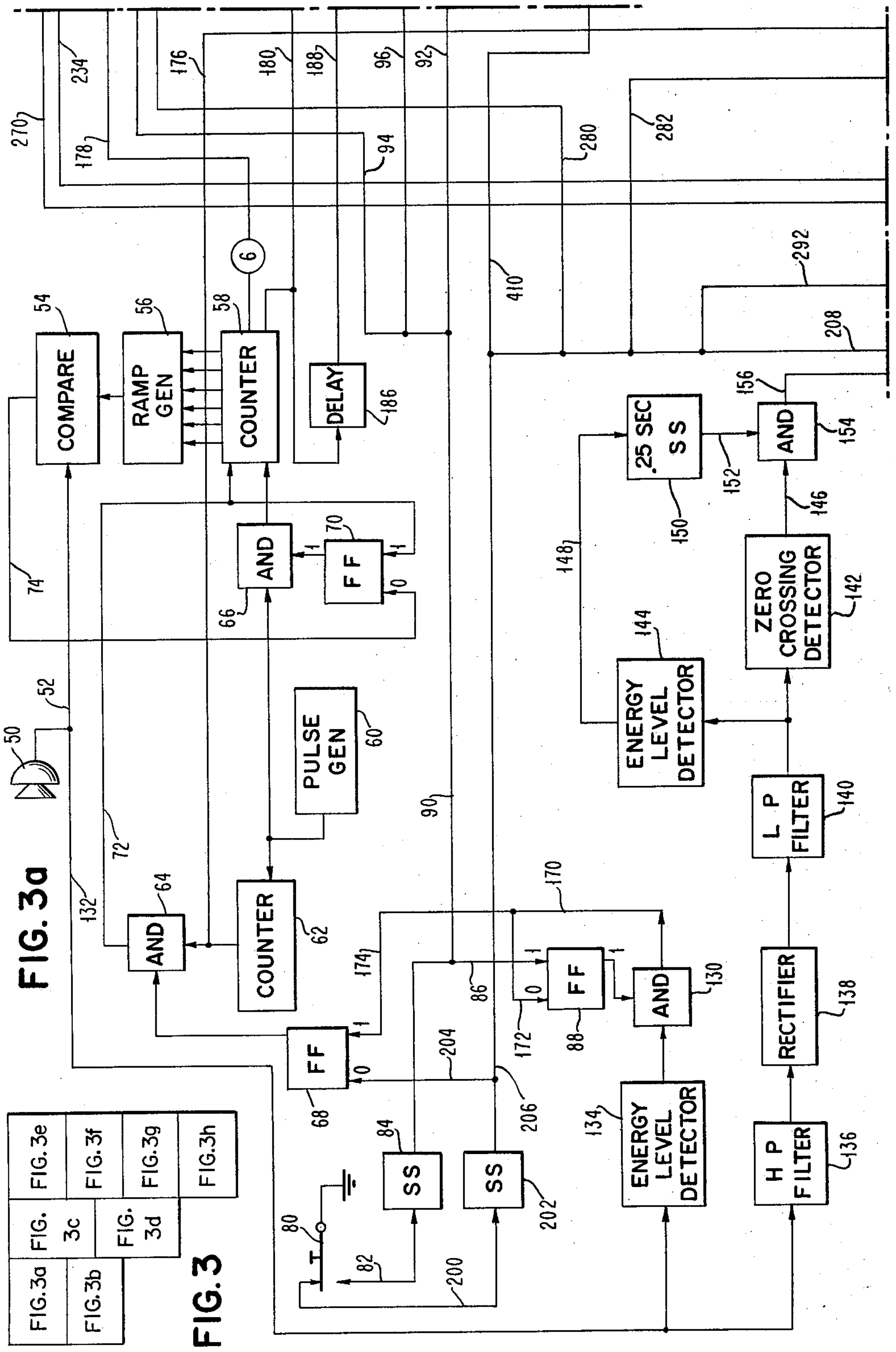
FIGURE 3 shows the arrangement of FIGURES 3*a*–3*h*.

Referring to FIGURE 3*a*, the audio input to the system is through a microphone 50. The audio input is converted in the microphone to an analog voltage on a line 52 through which it is applied to a comparator circuit 54. This comparator circuit is part of an analog-to-digital (A/D) converter for digitizing the analog electrical input whereby it may be stored in a core memory 16, FIGURE 3*c*. This A/D converter includes a ramp function generator 56, a counter 58, a 1.2 megacycle pulse generator 60, a pulse counter 62, a pair of AND gates 64 and 66, and two flip-flop circuits (FF) 68 and 70.

This A/D converter is one of a well known type for converting a voltage input signal from an analog to a digital representation employing a ramp voltage that is compared with the input voltage. In this particular ramp generator, the ramp voltage increases in increments in accordance with the value in the counter 58. The sample rate of the A/D converter is determined through the use of the counter 62 which is supplied from pulse generator 60 with clock pulses having an accurately controlled frequency. The counter 62 emits pulses at an 18 kc. rate.

Each 18 kc. pulse gated through AND gate 64 is applied to FF 70 through a line 72 to set FF 70 to its 1 state. In its 1 state, FF 70 gates pulses from the pulse generator 60 through AND gate 66 into counter 58. As the output voltage from the ramp generator changes in a positive going direction with the increase in the counted value in counter 58, the point at which it equals the instantaneous voltage on line 52 is sensed by the comparator circuit 54. The suddenly changing output potential of the comparator is used to generate a pulse that is sent through a line 74 to the 0 input of FF 70 to stop additional pulses from entering counter 58. The next 18 kc. pulse gated through AND gate 64 reads out the value in the counter 58, resetting the counter to zero, thus returning the ramp value to zero, and sets FF 70 to its 1 state.

When the operator is ready to speak into the microphone 50, he depresses a "talk" button 80 making connection to a line 82 to fire a pulse generator (single-shot) 84. This, and other pulse generators referred to hereinafter, are designated SS in the drawings and in the description. The output of SS 84 flows through a line 86 setting a flip-flop 88 to its 1 state. The output of SS 84 also flows on a line 90, dividing to three lines 92, 94 and 96. The signal on the line 96 flows to an OR circuit 98 in FIGURE 3*g*, providing input pulses through a group of eighteen lines 100 to a memory address register (MAR–2) in the memory 24, to preset MAR–2 to an initial address. This could be any address but, for the particular example described, this preset address is assumed to be zero. The single line 96 is connected to eighteen OR circuits, the outputs of which are applied to MAR–2 to set MAR–2 to the initial address. Line 96 also branches to a line 97. The signal on line 97, through an OR circuit 99 sets a flip-flop 110 in FIGURE 3*h* to its 0 state.

Figure 3B:
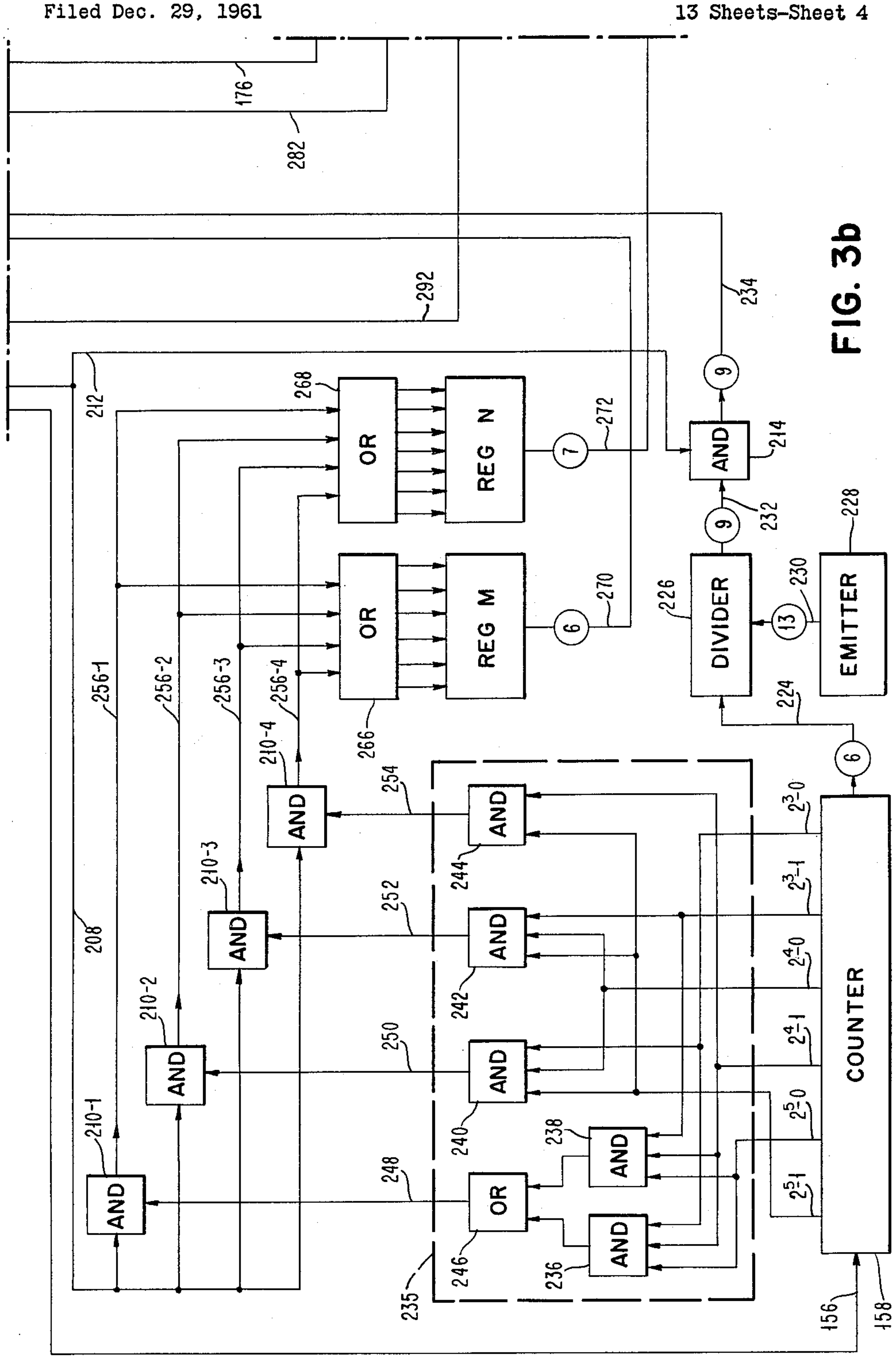
Figure 3C:
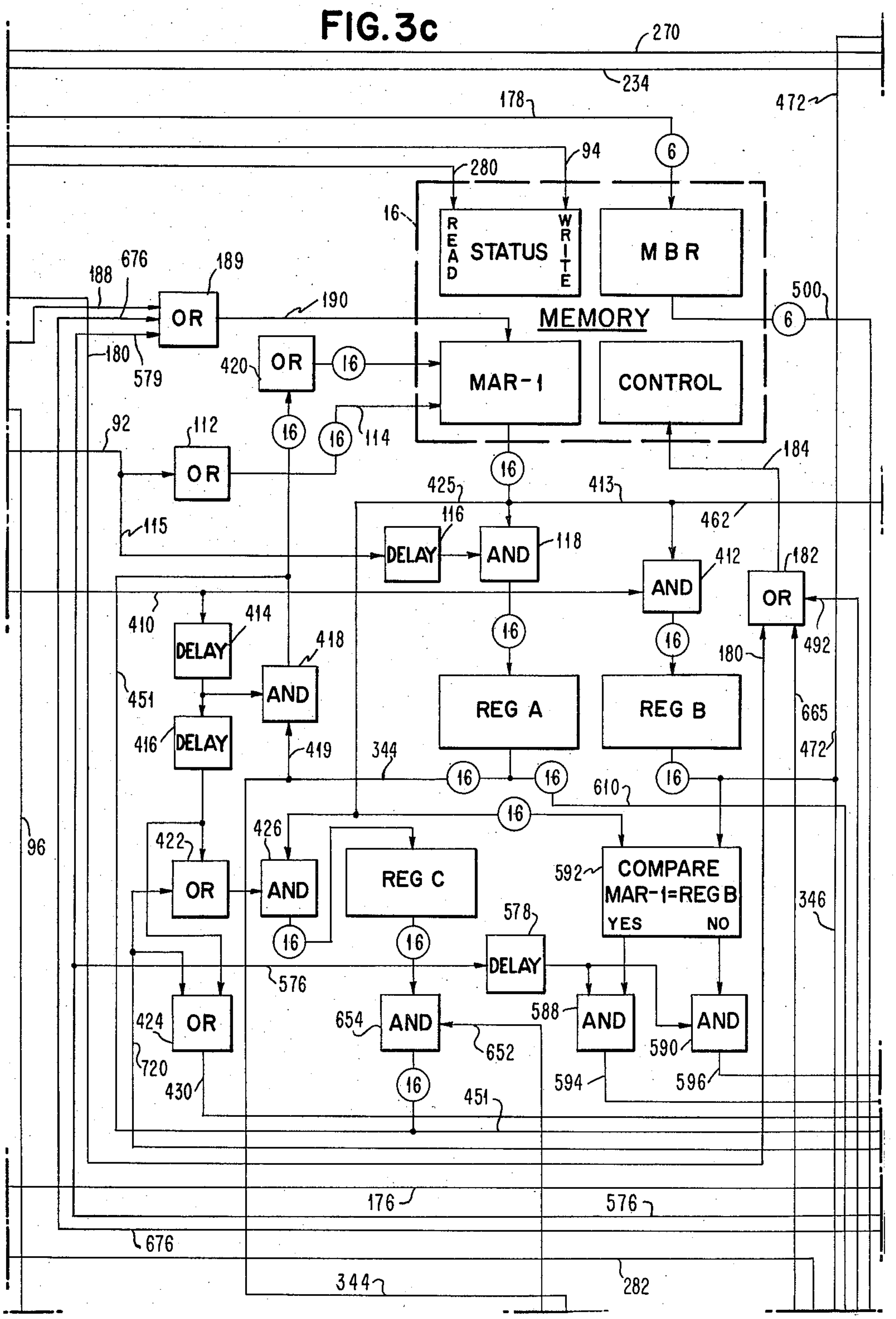

The signal on the line 94 flows to the memory unit, in FIGURE 3*c*, to set this unit in its "write" status preparatory to receiving input data. The signal on line 92 flows to a group of sixteen OR circuits 112 in FIGURE 3*c*. The output of the circuit 112 is applied through sixteen lines 114 to preset the memory address register (MAR–1) of memory 16 to an initial address, for example zero. The signal on the line 92 flows through a line 115 to a delay circuit 116 and, after a delay, is applied to a group of sixteen AND gates 118 to gate the preset address from MAR–1 into Register A.

When FF 88 was set to its 1 state by the signal on line 86, the 1 output was applied to an AND gate 130. The output of the microphone 50 also applies a signal to a line 132 which is applied, in parallel, to an energy threshold detecting circuit 134 and to a high-pass (HP) filter circuit 136 having a lower cut-off value of approximately 1 to 2 kc. The high-pass filter 136 is followed by a rectified 138 and a low-pass (LP) filter 140, having an upper cut-off value of approximately 500 cycles per second. The combination of the three units 136, 138 and 140 is operative to detect the fundamental or glottal frequency of the speaker's voice. The output of the low-pass filter 140 is applied, in parallel, to a 0 axis crossing detector circuit 142 and to an energy level detecting circuit 144. The circuit 142 emits signals on a line 146 for alternate 0 axis crossings.

This zero crossing detector may, for example, be one which compares the input voltage with a standard voltage and emits an output each time the voltages are equal. These outputs may be applied to a flip-flop the output of which is a single pulse in response to every two input pulses.

The output of the energy level detector 144 is applied through a line 148 to a 0.25 second single shot circuit 150. The output of this single shot circuit 150 is applied through a line 152 to an AND gate 154 where it gates all signals on line 146 which occur during the 0.25 second period through a line 156 into a six stage counter 158 in FIGURE 3*b*.

The energy threshold detector 134 detects that audio input has been entered into the system. The output signal from the circuit 134 is gated by the 1 state of FF 88 through gate 130 to a line 170. This signal is applied to the 0 input of FF 88 through a line 172 to reset it to its 0 state, and also is applied through a line 174 to the 1 input of FF 68, setting FF 68 to its 1 state.

The 1.2 megacycle pulses from the generator 60 are applied to the counter 62. The output of the counter 62 is a series of 18 kc. sample pulses which are applied to AND gate 64 and also to a line 176. The 1.2 megacycle pulses also are applied to AND gate 66, the other input of which is the 1 output of FF 70. When FF 68 is switched to its 1 state, the next following sample pulse from the counter 62 is gated through gate 64 and is applied, in parallel, to reset counter 58 and to switch FF 70 to its 1 state.

In its 1 state, FF 70 gates the 1.2 megacycle pulses through gate 66 whereby they are counted in counter 58. These 1.2 megacycle pulses are counted until the rising ramp function matches the analog value on line 52 thereby applying a signal through the line 74 to the 0 input of FF 70. FF 70 switches to its 0 state thereby closing the gate 66 and stopping the 1.2 megacycle pulses from entering the counter 58. Thus the counter 58 stands at a count representative of the instantaneous analog value on the line 52.

The next following one of the 18 kc. pulses from the counter 62 reads the value from the counter 58 onto a group of six lines 178 and at the same time resets the counter to 0. The binary count from the counter 58 is applied through the lines 178 to the memory buffer register of the memory unit 16, FIGURE 3*c*. An output pulse from the counter 58 at this time also is applied, through a line 180, an OR gate circuit 182, and a line 184, FIGURE 3*c*, to the control circuits of the memory 16 to effect the storage of the value transmitted on the lines 178 at the address then set in MAR–1. The signal on the line 180 also is applied, in FIGURE 3*a*, to a delay circuit 186 and, after a delay period, is applied through a line 188, OR gate 189, and a line 190 to advance MAR–1 by one increment whereby it stores the next address to be used.

The audio input is sampled at the 18 kc. rate and stored in successive memory buffer registers (MBR) of memory 16 until the audio input has been completed and the operator releases the "talk" button 80.

When the button 80 is released it makes contact with a line 200 to fire a pulse generator (single-shot) 202. The output of SS 202 is applied through a line 204 to the 0 input of FF 68, closing the gate 64 and, through a line 206 is applied to six different places. It is applied through a line 208 to a group of four AND gates collectively designated 210. It is applied through a line 212 and branches from line 208 to a group of nine AND gates 214.

The value entered into the six-stage counter 158, in FIGURE 3*b*, through the line 156 is applied through six lines designated 224 to a divider circuit 226. The second input to the circuit 226 is a constant value 4500 which is applied from an emitter circuit 228 through thirteen lines 230. In the divider circuit 226, the number 4500 is divided by the value in counter 158. The output of circuit 226 is applied through nine lines 232 to the group of nine AND gates 214. The output of AND gates 214 is applied through nine lines 234 to Register P in FIGURE 3*e*.

The number 4500 from circuit 228 was determined by dividing the 18 kc. sample rate by four. This division by four corresponds to the one-quarter second sampling period provided by the SS 150. Therefore, the number of 0 crossings counted in counter 158 during the one-quarter second period is equal to one-fourth of the fundamental frequency of the speaker's voice measured in cycles per second. Thus, by dividing the number 4500 by the value in counter 158, the approximate number of samples per second for the particular speaker's voice is determined and stored in Register P.

Selected outputs from the counter 158 are applied to a circuit 235. These selected outputs are from the three highest orders of counter 158. The outputs of each order of the counter, in accordance with binary notation, are a 1 output and a 0 output, i.e., an On output and an Off output. The circuit 235 includes five AND gates designated 236, 238, 240, 242 and 244. The 1 (On) output of the highest stage of the counter, designated $2^5$–1, is connected to AND gates 240, 242 and 244. The 0 (Off) output of this highest stage, designated $2^5$–0, is connected to AND gates 236 and 238. The 1 output of the second highest stage of the counter, designated $2^4$–1, is connected to AND gates 236, 238 and 244. The 0 output of the second highest stage, designated $2^4$–0 is connected to AND gates 240 and 242. The 1 output of the third highest stage, designated $2^3$–1, is connected to AND gates 238 and 242. The 0 output of the third highest stage, designated $2^3$–0, is connected to AND gates 236 and 240. The outputs of AND gates 236 and 238 are connected to an OR gate 246. The OR gate 246 is connected through a line 248 to gate 210–1. The outputs of AND gates 240, 242 and 244 are connected through lines 250, 252 and 254 to gates 210–2, 210–3 and 210–4 respectively. The outputs of the gates 210–1, 210–2, 210–3 and 210–4 are on lines 256–1, 256–2, 256–3 and 256–4 respectively.

These connections to the AND gates of circuit 235 effectively divide the audio input into four ranges of frequencies between 64 cycles per second and 252 cycles per second. This range is above and below the normal range of human voices. In accordance with the connections described hereinbefore, if the counter 158 stands at any count in the range 16 to 31, the signal on line 208 is gated through gate 210–1 to line 256–1. If the count is in the range 32 to 39, the signal on line 208 is gated through gate 210–2 to line 256–2. If the count is in the range 40 to 47, the signal on line 208 is gated through line 210–3 to line 256–3. If the count is in the range of 48 to 63, which is the full capacity of the counter, the signal on line 208 is gated through gate 210–4 to line 256–4.

By applying a factor of four to the value in counter 158, it is apparent that the signal on line 256–1 represents the frequency range from 64 to 127 cycles per second. The signal on line 256–2 represents the range from 128 to 159 cycles per second; the signal on line 256–3 represents the range from 160 to 191 cycles per second; and the signal on line 256–4 represents the range from 192 to 252 cycles per second.

When the signal arrives on the line 208, an output is derived from the conditioned one of the gates 210 and is applied through a corresponding one of the lines 256 through OR gates blocks 266 and 268. The OR gate block 266 consists of twelve OR circuits, a separate one for the 1 and 0 inputs of six flip-flops comprising Register M. Each line 256 is connected to six of the OR circuits within the block 266, some of the OR circuits being connected to 1 inputs of flip-flops in Register M and the remainder to 0 inputs of the flip-flops. These connections are so arranged that a signal on line 256–1 sets into Register M, in digital binary form, the value 42. Similarly, a signal on line 256–2 sets the value 32; a signal on line 256–3 sets the value 29; and a signal on line 256–4 sets the value 26.

The lines 256 are similarly connected to fourteen OR circuits in circuit block 268 to set values into the seven-order Register N. A signal on line 256–1 sets the value 72; a signal on line 256–2 sets the value 54; a signal on line 256–3 sets the value 47; and a signal on line 256–4 sets the value 41.

The value in Register M is available on six lines 270 and represent the number of memory buffer registers which is to be examined preceding the estimated end of a pulse period. This value in Register M is used in determining the starting address $W_1$ of the search window. The value in Register N is available on a group of seven lines 272 and represents the number of memory buffer registers, starting at $W_1$, which must be examined to reach the end $W_2$ of the search window. The foregoing values 42, 32, 29, 26, 72, 54, 47 and 41 have been calculated to include the ranges of variation of pulse period length which may be expected. These numbers are selected to assure that the actual pulse period end falls within the search window.

The signal on line 206 is applied through a line 280 to the memory 16, in FIGURE 3*c*, to switch this memory to its "read" status. The signal on the line 206 is applied through lines 282 and 284 to switch the memory 24, in FIGURE 3*g*, to its "write" status. The signal on line 282 also is applied through a line 286, in FIGURE 3*g*, to a group of eighteen AND gates 288 to gate the address in MAR–2 through a group of eighteen lines 290 into Register F.

*Expansion/Compression Ratio*

Figure 3D:
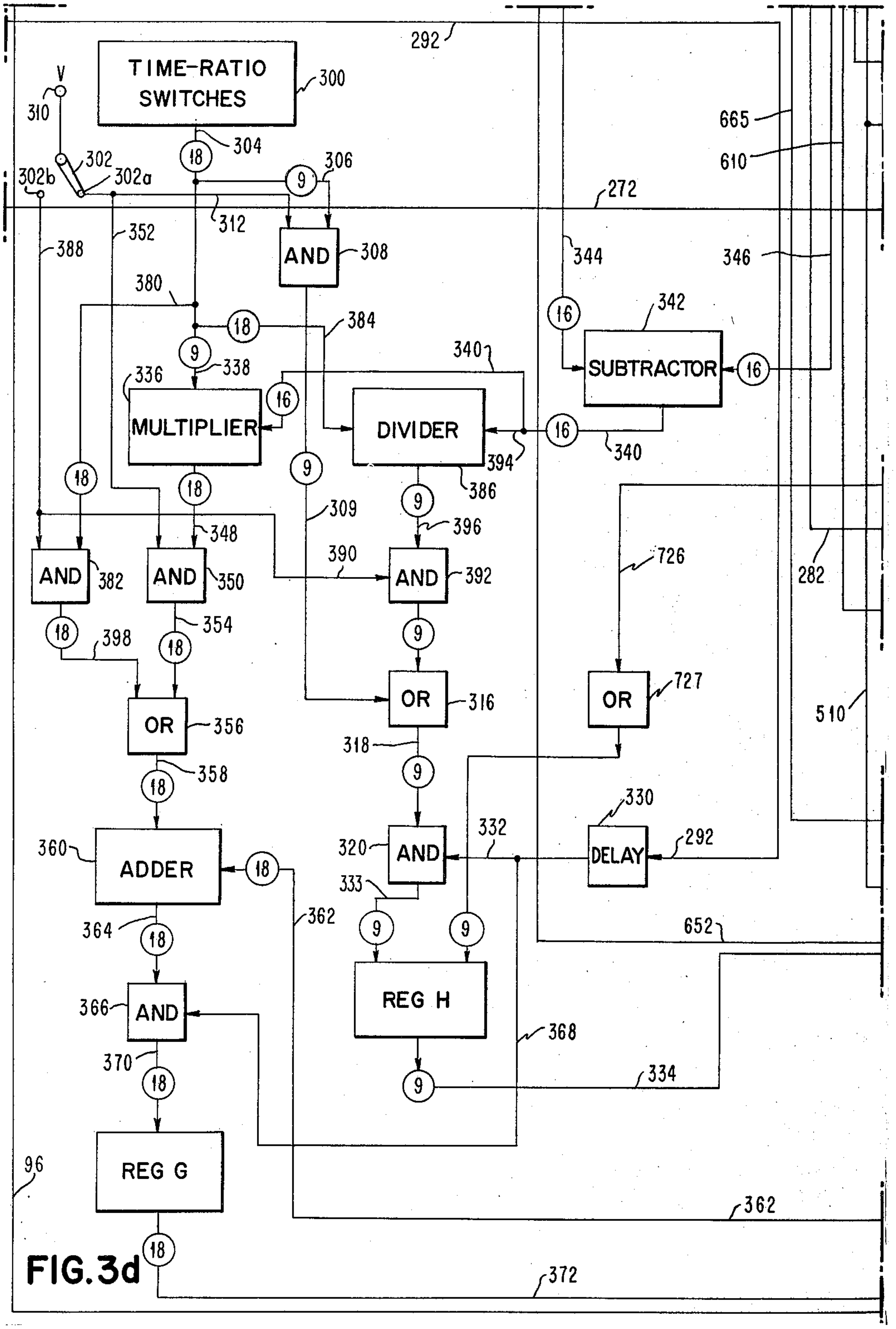

The signal on line 206, in FIGURE 3*a*, also is applied through a line 292 to a ratio specifying circuit shown in FIGURE 3*d*. The expansion or compression ratio may be determined in two ways. First, the length of time which the modified or processed audio is to require in playing back may be specified in as a number representing the number of samples per second multiplied by the number of seconds. Second, the desired ratio of expansion or compression may be specified directly.

The length or ratio is specified by setting up a bank of 18 switches designated 300. In the described embodiment the memory capacities are sufficient for a maximum expansion ratio of approximately four. The expansion ratio is set up in binary form in the nine-high order switches of the switch bank 300. The three high order switches are designated $2^2$, $2^1$ and $2^0$. The six switches below the three high order switches are used for setting up, in binary form, a decimal fraction compression ratio. These latter six switches are given the designations $2^{-1}$, $2^{-2}$, $2^{-3}$, $2^{-4}$, $2^{-5}$ and $2^{-6}$. This bank of switches may, for example, be provided to set flip-flops to their 0 and 1 states in accordance with binary notation.

If the input data to be processed are to be fitted into a specific time slot, a conversion chart, a portion of which is shown in FIGURE 4, is referred to to convert the time in seconds to binary notation for setting the switch bank 300. The switches are set to specify the number of memory buffer registers which will be occupied in the specified time period. This number of registers is determined by multiplying the 18 kc. sample rate by the time in seconds.

To set up the system for a specified expansion or compression ratio, the ratio is set into the switch bank 300 as described and a switch 302 is set to make contact with its upper terminal 302*a*. The value set into the nine high order switches is applied through nine of eighteen lines 304 which branch into nine lines 306 to a group of nine AND gates 308. A signal is applied from a supply terminal 310 through the switch 302 and lines 312 to gate the signals on the nine lines 306 through the gates 308 to an OR gate 316. The output of the gate 316 on nine lines 318 is applied to a group of nine AND gates 320. The signal from SS 202 through lines 206 and 292 is applied to a delay circuit 330. The output of delay 330 is applied as a gating signal through a line 332 to the nine AND gates 320 to gate the ratio value into Register H. The value in Register H is available on a group of nine lines 334. Register H now contains the specified ratio by which the input audio data are to be expanded or compressed.

The signals of the nine lines corresponding to the previously set switches in switch bank 300 also are applied to a multiplier circuit 336 through a group of nine branch lines 338. A second input to multiplier circuit 336 is through a group of sixteen lines 340. These lines 340 carry in binary form the total number of memory buffier registers which have been filled with audio input data in memory 16. This number is derived by subtracting the original starting address in Register A, FIGURE 3*c*, from the address in Register B, FIGURE 3*c*, which is the address following the address of the last audio data stored in memory 16. The Register A value is applied to a substract circuit 342 through a group of sixteen lines 344. The value in Register B is applied to the subtract circuit 342 through a group of sixteen lines 346.

The value from subtract circuit 342 is multiplied in the circuit 336 by the number (ratio) set into the switch bank 300. The output on a group of eighteen lines 348 is applied to a group of eighteen AND gates 350. These signals on lines 348 are gated through the gates 350 by a signal through the switch 302 on line 352. The output of the gates 350 on a group of eighteen lines 354 is applied to a group of eighteen OR gates 356. The output of the OR gates 356 is applied through eighteen lines 358 to an adder circuit 360. A second input to the adder circuit 360 through a group of eighteen lines 362 is the starting address stored in MAR–2, FIGURE 3*g*. This is the address at which storage of the processed data in memory 24 is to begin. These two values are added and the sum is applied through eighteen lines 364 to a group of eighteen AND gates 366. These signals are gated through AND gates 366 by the output of delay circuits 330 which is applied through a line 368. The output of gates 366 is applied through a group of eighteen lines 370 to Register G which now contains the address of the memory buffer register following the last memory buffer register which is to be used in memory 24 to achieve the desired ratio of expansion or compression. The value in Register G is available on a group of eighteen lines 372.

*Time Length Specified*

For a specified time length, the converted number from the chart shown in FIGURE 4 is entered into the eighteen switches of the switch bank 300 and the switch 302 is set to its lower contact 302*b*. The outputs from the switch bank 300 are applied through the eighteen lines 304 and 380 to a group of eighteen AND gates 382. This value also is applied through a group of eighteen lines 384 to a divider circuit 386. The switch 302 applies gating signals through a line 388 to the gates 382 and through a line 390 to a group of nine AND gates 392.

A second input to the divider circuit 386 through a group of sixteen lines 394 is the output of the subtract circuit 342. The number set in the switch bank 300 is divided by the value applied on lines 394 and the quotient is applied through a group of nine lines 396 to the AND gates 392. The output is gated through the AND gates 392 by the gating signal on line 390, through the OR gates 316 and line 318 to AND gates 320 where it is again gated by the signal on line 332 into Register H. Again Register H contains the ratio by which the input audio data are to be expanded or compressed.

The signals gated through AND gates 382 are applied through eighteen lines 398 to the OR gates 356 and through lines 358 to the adder circuit 360. Again the starting address in MAR–2 is added and the sum is gated through AND gates 366 to Register G. Register G again contains the memory address following the last address which is to be used in memory 24 to achieve the ratio of compression or expansion.

The signal of line 206, in FIGURE 3*a*, also is applied through a line 410 to gate the address in MAR–1, FIGURE 3*c*, through a group of sixteen AND gates 412 into Register B. The address in MAR–1 is applied to gates 412 via sixteen lines 413 and, at this time, is the address following the last address at which audio input data is stored in memory 16. This value in Register B is used in the ratio circuit described above and, although the signals on lines 292 and 410 are applied at the same time, the one on line 292 is delayed in circuit 330.

*Pulse Period Determination*

The signal on line 410 also is applied, in FIGURE 3*c*, to a delay circuit 414, the output of which is applied, in parallel, to a delay circuit 416 and to a group of sixteen AND gates 418. The address in Register A is applied to gates 418 through lines 344 and 419. The signal applied to the gates 418 gates the address in Register A, the starting address of data in memory 16, through a group of sixteen OR gates 420 into MAR–1.

The delayed output of circuit 416 is applied in parallel to two OR gates 422 and 424. The output of OR 422 gates the MAR–1 address on lines 425 through a group of sixteen AND gates 426 into Register C. Since this is the starting point of the data stored in memory 16, Registers A and C at this time contain the same address. However, Register C is changed periodically to the starting address of each pulse period to be examined.

Figure 3E:
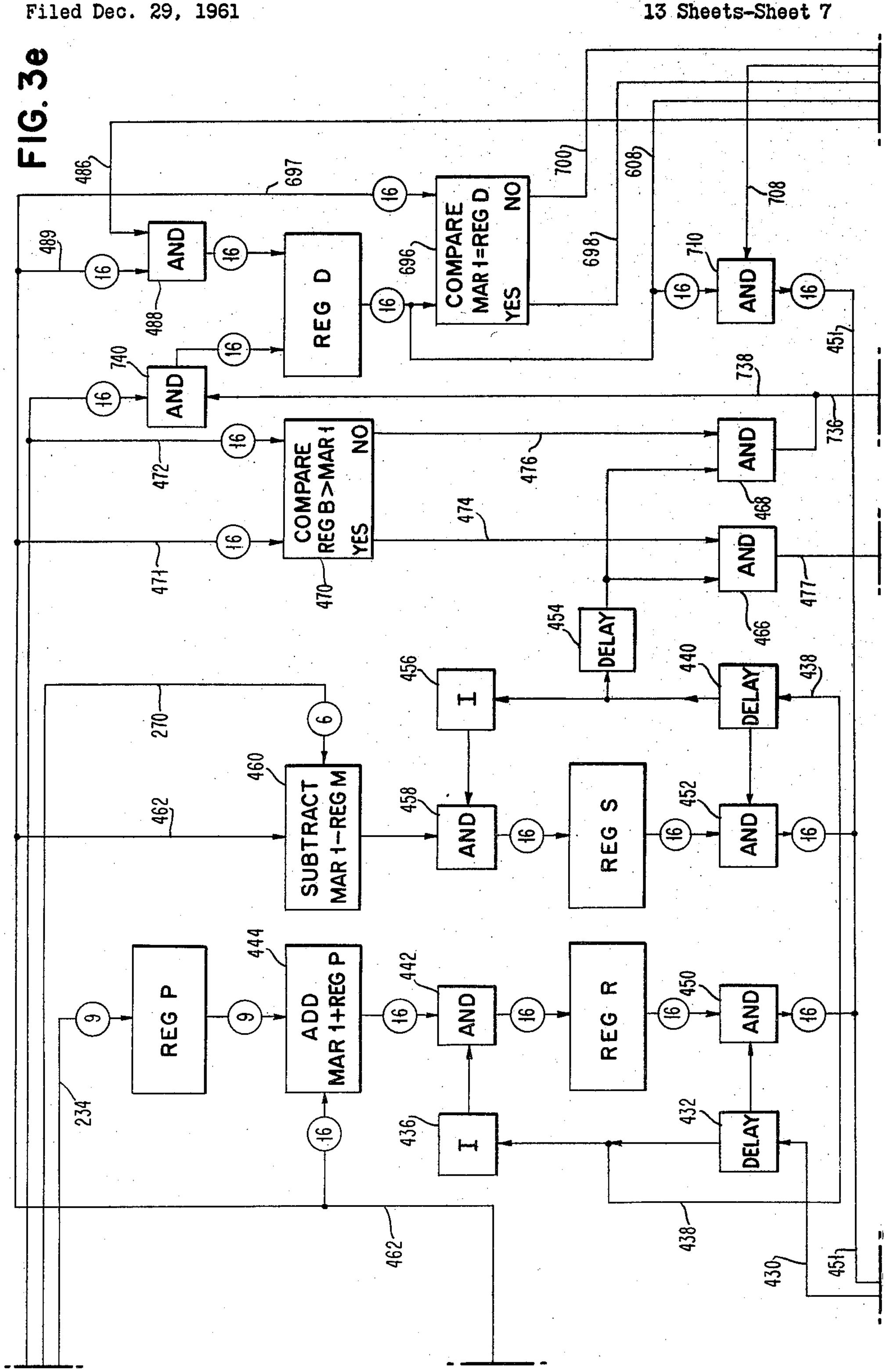
Figure 3F:
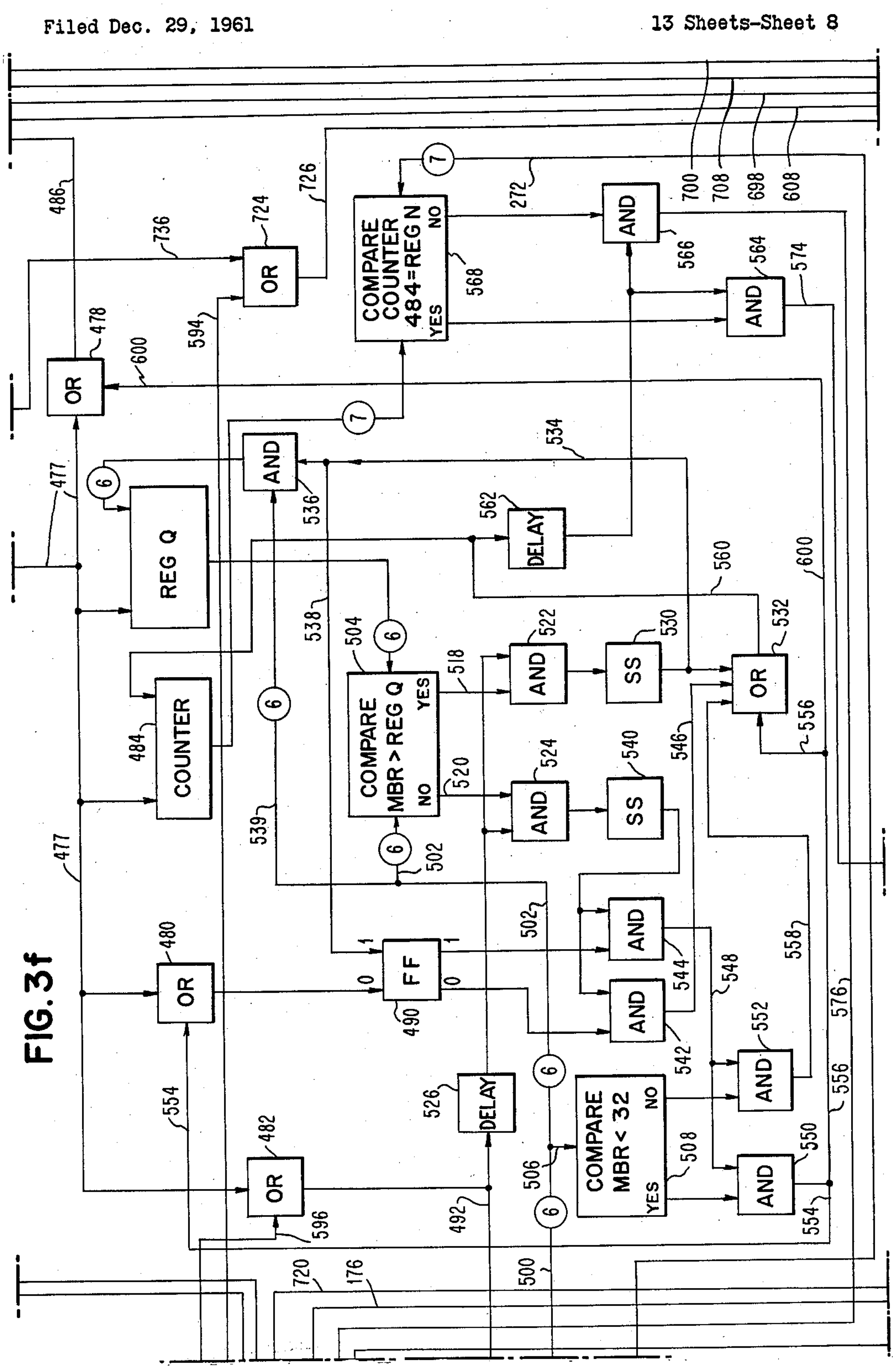
Figure 3G:
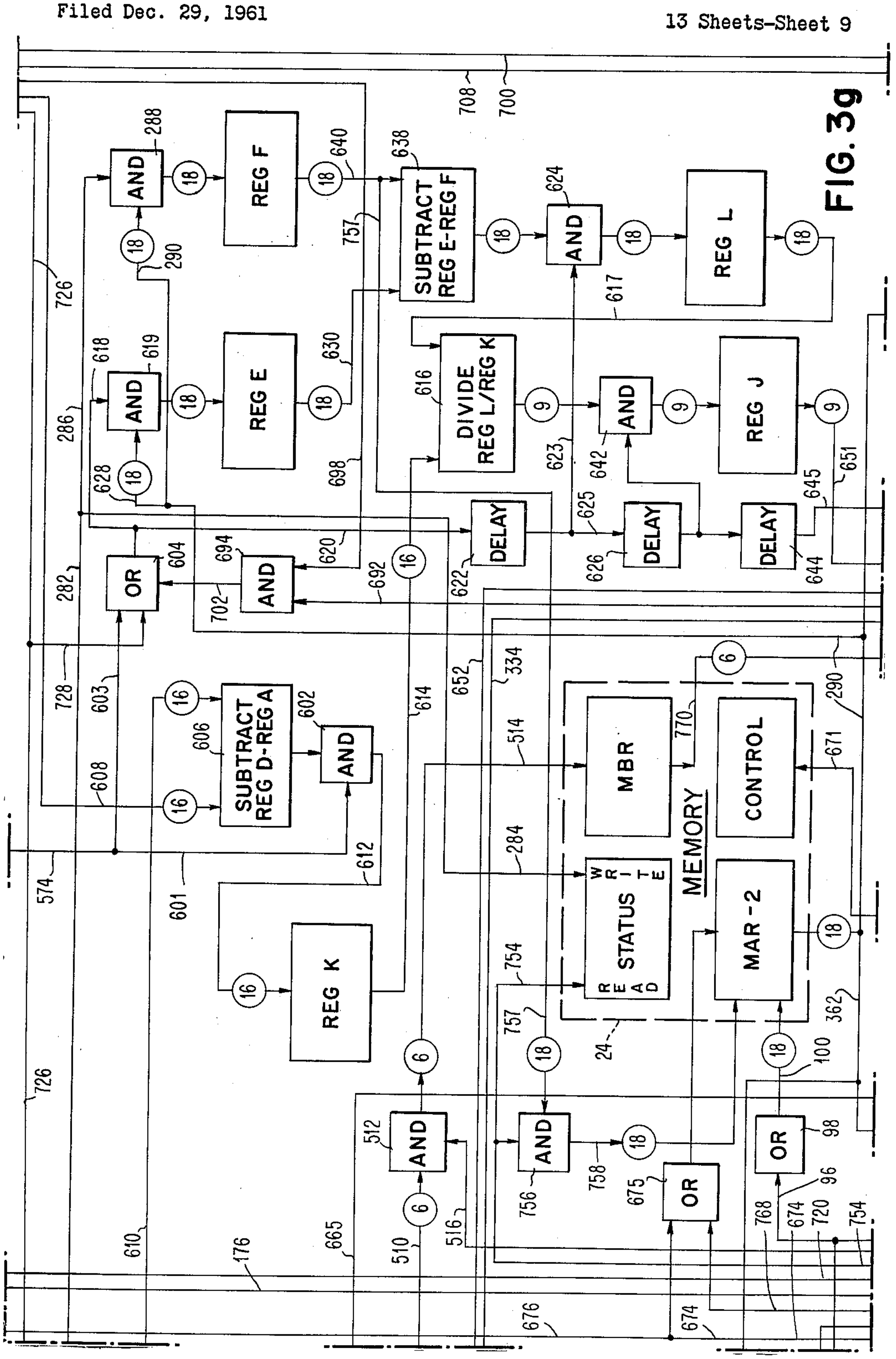

The output of OR 424 is applied through a line 430 to a delay circuit 432, FIGURE 3*e*. The output of circuit 432 is applied, in parallel, to an inverter 436 and through a line 438 to a delay circuit 440. A group of sixteen AND gates 442 have been held open by the output of inverter 436 up to this time and have thus gated the contents of an adder circuit 444 into Register R. However, the inverted output of delay circuit 432 now closes the gates 442 thus preventing further transfer of data to Register R. Therefore, the value in Register R is the address from MAR–1 plus the value in Register P which is approximately the number of memory buffer registers in memory 16 which are required to store a single pulse period of the input data. Thus, the value in the Register R is an approximation of the end address of the first pulse period to be examined. The output of delay 432 also is applied to a group of sixteen AND gates 450 to gate the value in Register R through sixteen lines 451 and the OR gates 420, FIGURE 3*c*, into MAR–1. MAR–1 now contains the address at which the first pulse period is estimated to end.

The output of delay 432 applied to delay 440 through line 438 is applied to a group of sixteen AND gates 452, to a delay circuit 454 and to an inverter 456. The output of inverter 456 normally holds open a group of sixteen AND gates 458 to gate the difference from a subtract circuit 460 into Register S. The subtract circuit 460 has as one of its inputs, via the lines 270, the value in Register M, FIGURE 3*b*. The circuit 460 has as its other input, via lines 413 and 462, the address in MAR–1, FIGURE 3*c*.

At the time the gates 458 are closed, the circuit 460 has subtracted from the MAR–1 address, which is the estimated end of the pulse period, the value in Register M which indicates how far in advance of the estimated end of the pulse period the search window should begin. This difference value now stands in Register S. The output of delay circuit 440 gates this difference value through the AND gates 452 and, via lines 451 and OR gates 420 into MAR–1. MAR–1 now contains the beginning address $W_1$, FIGURE 2, of the search window which is to be examined for the actual end of pulse period address.

The output of delay 440 which was further delayed in circuit 454 is applied to a pair of AND gates 466 and 468. The second inputs to these AND gates are the outputs of a compare circuit 470. One input to circuit 470, via lines 413, 462 and 471, is the address $W_1$ in MAR–1. Another input to circuit 470, via sixteen lines 472, is the address in Register B. Thus, the compare circuit 470 is determining whether the address in Register B is greater than the $W_1$ address in MAR–1. If it is greater, the output signal is on a line 474; if it is equal or less, the output signal is on a line 476. Since this is the first pulse period of the input data to be examined, the value in Register B certainly will be greater than the address in MAR–1 and the output is on line 474.

This output signal is gated through AND 466 by the delayed output of delay 454 and is applied in parallel via a line 477 to OR gates 478, 480, 482, to a window counter 484, and to Register Q. The output of OR 478 is applied through a line 486 to a group of sixteen AND gates 488 to gate the address in MAR–1 through lines 413, 462 and 489 into Register D. At this time MAR–1 and Register D contain the first address $W_1$ in the search window. The output of AND 466 is applied to Register Q to set this register to a value of 32 which, with reference to FIGURE 2 is known to be the "0" value. The signal also resets counter 484 to 0. This counter is used to count the number of addresses in the search window which have been examined at any time. This number subsequently is compared with the value in Register N which is the number of addresses to be examined.

The output of AND 466 applied to OR 480 sets a flip-flop (FF) 490 to its 0 state, whereas the signal applied to OR 482 is applied through a line 492 to OR 182, FIGURE 3*c*, and through the line 184 to start memory 16 which is now in its "read" status. Thus, the data in the memory buffer register at the address in MAR–1 is read out on a group of six lines 500. This read out value is applied in parallel through lines 500 and 502, FIGURE 3*f*, to a compare circuit 504, through lines 500 and 506 to a compare circuit 508, and through lines 500 and 510 to a group of six AND gates 512, FIGURE 3*g*. The output of the gates 512 on six lines 514 is the input to the memory buffer registers of memory 24. However, this data on the lines 510 is not gated into memory 24 unless a gating signal appears on a line 516.

The digital value on lines 502 is compared in the circuit 504 with the value 32 in Register Q. The comparison is made to see if the memory buffer register value is greater than the value in the Register Q. If it is greater, an output is provided on a line 518 whereas, if the value is equal or less, the output is on a line 520. Assume that the memory buffer register value is greater than 32. The output is on line 518 and is applied to an AND gate 522 rather than on the line 520 to an AND gate 524. This signal is gated through AND 522 or AND 524 by the output of a delay circuit 526 which in turn has for its input the output of OR 482. The output of AND 522 triggers a pulse generator (single shot) 530, the output of which is applied in parallel to an OR gate 532, via a line 534 to an AND gate 536. The line 536 branches into a line 538 to the 1 input of flip-flop (FF) 490. The value read from the memory 16 and applied to compare circuit 504 also is applied through six lines 539 to gates 536 and therefore is gated by the output of SS 530 into Register Q.

If the value on the lines 502 is less than the value 32, the output is on the line 520 and similarly is gated through AND 524 to fire a pulse generator (single shot) 540 and apply gating signals to two AND gates 542 and 544. These two gates sample the status of FF 490. When FF 490 is in its 0 state, a signal is gated from AND 542 on a line 546 to OR 532, whereas, when FF 490 is in its 1 state, a signal is gated through AND 544 on a line 548 to two additional AND gates 550 and 552. These latter two gates have as their second inputs the outputs of the compare circuit 508 which compares to determine whether the value just read from memory 16 is less than the "0" value (32) which is permanently set in the circuit 508.

If the value from memory 16 is less than "0" (32) the output is from AND 550 to two lines 554 and 556. Lines 554 and 556 are connected respectively to OR 480 and to OR 532. If the memory value is greater than "0" (32), the output is from AND 552 to a line 558 which also is connected to OR 532. Thus, regardless of the relative values from memory 16, from Register Q, and from compare circuit 508, a signal is derived from OR 532 on a line 560. If the memory value is less than the value in Register Q, and if FF 490 is in its 1 state, and if the memory value is less than "0" (32), the signal on line 554 is applied to OR 480 to reset FF 490 to its 0 state. As long as FF 490 is in its 0 state, the address in Register D will not be changed by subsequent comparison in circuit 508.

The signal on line 560 is applied to counter 484 to step it one increment and is applied to a delay circuit 562. The output of the delay 562 is applied to two AND gates 564 and 566. The second inputs to these latter two AND gates are the outputs of a compare circuit 568, which compares the value in counter 484 with the value in Register N, FIGURE 3*b*, applied via lines 272, to determine whether all registers within the search window have been examined. If they have been examined, the output of AND 564 is applied through a line 574 to circuitry for transferring data from memory 16 to memory 24. This operation is described subsequently.

If the value in counter 484 does not equal the Register N value, the output of AND 566 on line 576 is applied to a delay circuit 578, FIGURE 3*c*, and, through a line 579, OR gate 189 and line 190, to MAR–1 to advance MAR–1 by one increment to thus present the next address for interrogation. The output of delay 578 is applied to a pair of AND gates 588 and 590. The second inputs to these latter two AND gates are the outputs of a compare circuit 592 which compares the address in MAR–1 with the address in Register B to determine whether the last address of stored input data in memory 16 has been reached. If it has been reached, then the MAR–1 address equals the Register B address and the output is from AND 588 on a line 594. If the last address has not been reached, the output is from AND 590 on a line 596.

Assuming that MAR–1 does not equal Register B, the signal on line 596 is applied to OR 482 to again start the read out of a value from memory 16, the comparison of the memory value with the value in Register Q, the comparison to determine whether the memory value is less than "0" (32), etc. This is a repetition of the previously described cycle. This cyclic operation is continuous until the count in counter 484 does equal the value in Register N at which time all addresses within the search window have been examined and a "0" cross-over point following a maximum positive value has been detected.

Each time the memory value is greater than the contents of Register Q, this new value is gated by a signal on line 534 into Register Q to replace the previous value. Thus, Register Q always contains the most positive value detected. This is true regardless of how many positive peaks may be detected within the search window, since a positive peak which is equal or higher than a following positive peak will not be replaced.

Thus, it is seen that, when the memory value is greater than the value in Register Q, FF 490 is set to its 1 state. FF 490 then remains in its 1 state until the first memory value less than "0" (32) is detected. This means that as soon as the memory value drops below the "0" line (32) a "0" crossing following a positive peak has been detected. It is desired to store this "0" crossing address, actually the address next following the "0" crossing in Register D. Therefore the output of AND 550, which indicates this "0" crossing, is applied through lines 556 and 600, OR 478 and line 486 to AND gates 488. This gates into Register D via lines 413, 462 and 489, the address in MAR–1 which is the first address following the "0" crossing data. This recording in Register D occurs prior to the completion of inspection of the entire search window, usually near the center of the search window.

Before proceeding with the description of the data transfer operation, the purpose in entering the $W_1$ address into Register D by the output from AND gate 466 via OR 478, line 486 and AND gates 488 will be explained.

If the address $W_1$ of the beginning of the search window had not been entered into Register D, this register, if there had been processing of preceding pulse periods, would have been a lower address than those currently being processed. Otherwise it would probably be cleared to zero.

Since, during interrogation of window data, new data are not entered into Register D until a "0" crossing following a positive peak has been detected, the situation must be considered where the Register B address does exceed the $W^n_1$ address in the $n$th pulse period but a positive peak followed by a "0" crossing does not exist between the address $W^n_1$ and the address in Register B. This situation could occur in the last pulse period of data due to the exhaustion of input data or during any pulse period due to a pause or low amplitude input where "0" crossings simply do not occur.

The entire window, including some empty buffer register would be interrogated. Register D would then stand at the erroneous address which the system would consider as the end of the pulse period.

By setting Register D to a new $W_1$ address at the start of processing of each pulse period, it is assured that an "end of pulse period" address is provided even though it may in the above circumstances, be only an approximation.

*Transfer to Memory 24*

When the last address in the search window has been interrogated, an output is derived, from AND 564 on line 574, as described hereinbefore, and the transfer of data from memory 16 to memory 24 may then be accomplished.

The signal applied to the line 574 is applied through a line 601 to a group of sixteen AND gates 602 and through a line 603 to an OR gate 604. The second input to the AND gates 602 is the output of a subtract circuit 606 which has as one of its inputs, through a group of sixteen lines 608, the address stored in Register D, FIGURE 3*e*. For the other input, the circuit 606 has the address from Register A, FIGURE 3*c*, which is transmitted through a group of sixteen lines 610. The difference between the addresses in Registers D and A is gated, by the signal on line 601, through AND gates 602 and a group of sixteen lines 612 into Register K. The number in Register K is applied through a group of sixteen lines 614 to a divide circuit 616 which has for its other input, via sixteen lines 617, the value in Register L.

The output of OR 604, in response to the signal on line 603, is applied via a line 618 to a group of eighteen AND gates 619 and via a line 620 a delay circuit 622. The delayed output of 622 is applied via a line 623 to a group of eighteen AND gates 624 and via a line 625 to a delay circuit 626. The output of OR 604 which is applied to AND gates 619 gates the address stored in MAR–2 through the lines 290 and 628 and AND gates 619 into Register E. The address in Register E is entered via eighteen lines 630 into a subtract circuit 638. Also entered into the subtract circuit 638 via eighteen lines 640 is the address stored in Register F. Since this is the first pulse period inspected, both Registers E and F contain the initial MAR–2 address and the difference is 0. This difference value is gated through AND gates 624 into Register L by the delayed output of circuit 622.

The divider circuit 616 now contains the value from Register L, which is 0 at this time, and the value in Register K which is a number equal to the number of memory addresses included in the first pulse period. The value in Register L is divided by the value in Register K and the dividend is gated through nine AND gates 642 by the delayed output of circuit 626 and is stored in Register J.

Figure 3H:
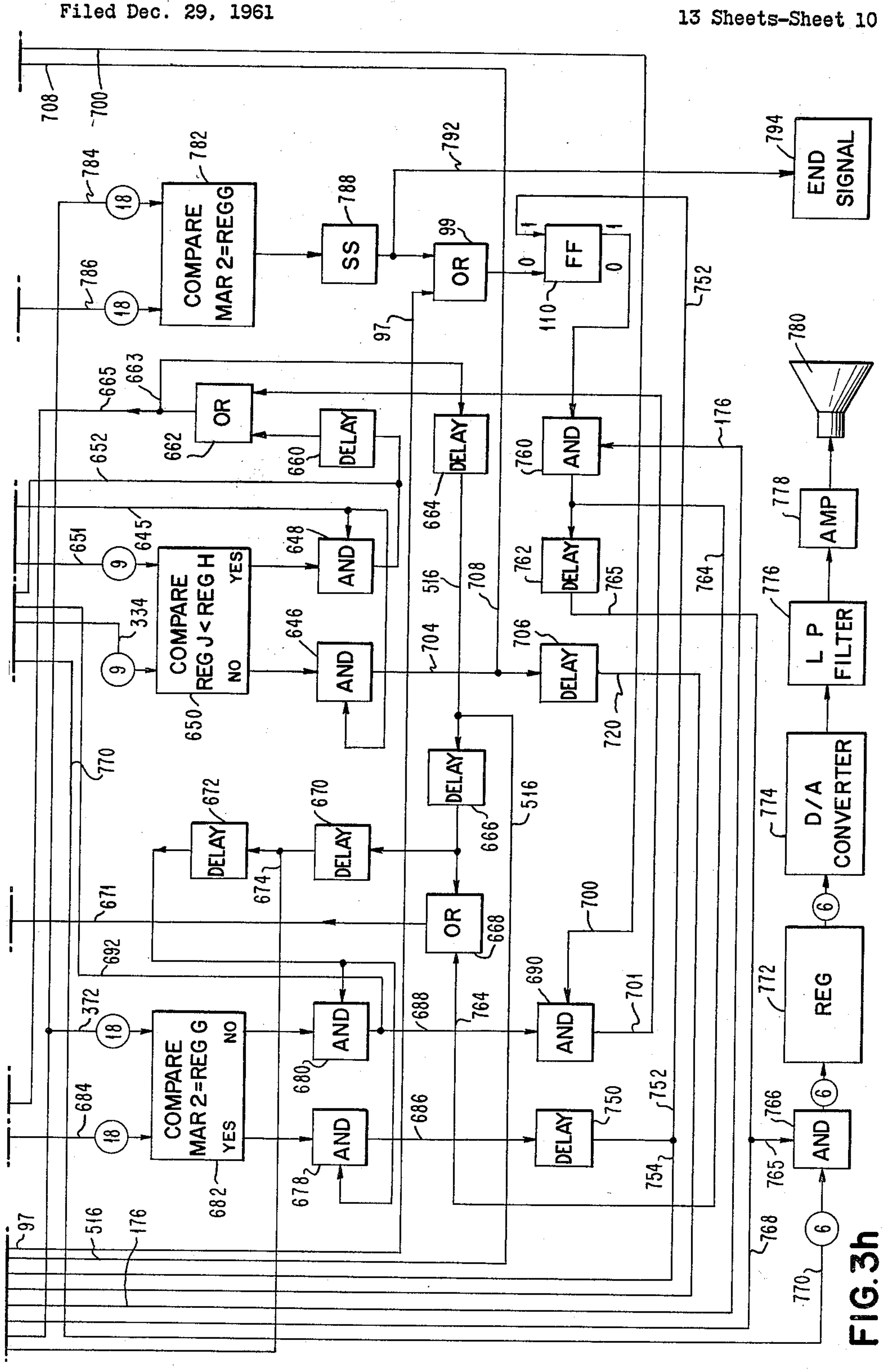

The output of circuit 626 is further delayed in a circuit 644 and then is applied through a line 645 to a pair of AND gates 646 and 648, FIGURE 3*h*. The latter two gates are connected to the outputs of a compare circuit 650. One input to the compare circuit 650 via lines 651 is the value stored in Register J, whereas the other input is the value stored in Register H, FIGURE 3*d*, which is applied through lines 334. The value in Register J is the ratio of the length of record (number of memory buffer registers) presently used in memory 24 to the length of input data (number of memory buffer registers) from memory 16 which has been inspected. The value in Register H is the predetermined ratio of expansion or compression which is to be achieved.

The circuit 650 in effect asks the question "Is the value in Register J less than the value in Register H?" An output to AND 646 indicates that the Register J value is not less than the value in Register H, whereas an output to AND 648 indicates that the value in Register J is less. When an output is derived from AND 648, it is required that the data for the pulse period in memory 16, which has just been examined, be transferred into memory 24. If the output is from AND 646, it is required that the just examined pulse period in memory 16 be excluded from transfer to memory 24. This is necessary to maintain the proper relationship between the actual ratio of expansion or compression and the desired ratio.

Assuming that the Register J value is less than the Register H value, the AND 648 output is applied through a line 652 to a group of sixteen AND gates 654, in FIGURE 3*c*, to gate the address in Register C through a group of sixteen lines 451 and OR circuits 420 into MAR–1. MAR–1 now contains the address of the start of the pulse period just examined. Since this is the first pulse period it happens that the Register C address is the same as the starting or Register A address.

The signal from AND 648 also is applied to a delay circuit 660 and through an OR gate 662 via a line 663 to a delay circuit 664 and via a line 665 to the OR gate 182 in FIGURE 3*c* to apply a signal through line 184 to memory 16 to start this memory. It will be recalled that this memory is still in the "read" status and therefore the data in memory 16 at the address stored in MAR–1 are read out on the lines 500. It is described hereinbefore how this value from memory 16 is applied to AND gates 512 in FIGURE 3*g* but is not passed therethrough in the absence of a signal on the line 516.

The output of delay 664 is applied through line 516 in parallel to the AND gates 512 and to a delay circuit 666. Thus, the value from memory 16 at the MAR–1 address is presented via lines 514 to the memory 24. The delayed output of circuit 666 is applied in parallel to an OR gate 668 and to a delay circuit 670. The output of OR 668 is applied through a line 671 to the start memory control circuits for memory 24 and thus enters the memory 16 value at the MAR–1 address into memory 24 at the MAR–2 address. The output of delay 670 is applied to a delay circuit 672. It also is applied through a line 674 and an OR gate 675 to advance MAR–2 to its next address. Line 674 branches into a line 676 which is connected to OR gate 189 and line 190 in FIGURE 3*c* to advance MAR–1 to the next address.

The delayed output of circuit 672 is applied in parallel to a pair of AND gates 678 and 680. The second inputs to these latter two gates are the outputs of a compare circuit 682 which has for its inputs the address in Register G FIGURE 3*d*, via lines 372 and the address in MAR–2 via lines 684. The function of this circuit is to compare and determine whether the address in MAR–2 is equal to the address in Register G. If the two addresses are equal, an output is effected from AND 678 on a line 686. If the addresses are not equal, an output is effected from AND 680 on a line 688. If the values are equal and a signal is applied to line 686, this indicates that the entire space allocated in memory 24 for expanded or compressed data has been filled. Consideration of this condition is described later.

A signal on line 688 indicates that the entire allocated space in memory 24 has not been filled. This signal on line 688 is applied in parallel to an AND gate 690 and through a line 692 to an AND gate 694. Both gates 690 and 694 have, as their second inputs, outputs from a compare circuit 696 in FIGURE 3*e* which functions to compare the MAR–1 address applied through lines 413, 462 and 697 with the Register D address. This circuit 696 is effective to indicate whether data in the last memory buffer register of the pulse period being transferred from memory 16 to memory 24 have been transferred. If it has been transferred, MAR–1 equals Register D and an output is produced on a line 698 which is applied to AND gate 694. If MAR–1 does not equal Register D, an output on a line 700 is applied to AND gate 690.

Assume that MAR–1 does not equal Register D and that a signal is received on line 700 to gate the signal on line 688 through AND 690. The output of AND 690 on a line 701 is applied to OR 662 to start another transfer cycle, in the same manner as the previously described output from OR 662, to transfer data from a next memory buffer register in memory 16. After each transfer of data from memory 16 to memory 24, the output of circuit 696 determines whether another transfer cycle is to be initiated.

The transfer of data from memory 16 to memory 24 continues in the cyclic manner just described until one of two things happens. Either the circuit 696, FIGURE 3*e*, indicates that the MAR–1 address equals the Register D address or circuit 682, FIGURE 3*h*, indicates that the MAR–2 address equals the Register G address. When MAR–1 equals Register D, the output of circuit 696 on line 698 gates the signal on line 692 through AND 694. This signal is applied to OR 604 via a line 702 to gate into Register E, via lines 290 and 628, the address then stored in MAR–2. The addresses in Registers E and F are again subtracted and the difference which is entered in Register L. This value is divided in circuit 616 by the value in Register K to again determine the ratio between the length of record in memory 24 and the length of the input data inspected in memory 16. This number (ratio) is again compared in circuit 650 with the number (ratio) in Register H and a determination is made whether the pulse period just copied from memory 16 should be copied again into memory 24. If it is to be copied again, a signal is again derived on line 652 to initiate the second read out of the same pulse period of data from memory 16. If the Register J value is at least as great as the Register H value, an output from AND 646 on a line 704 is applied in parallel to a delay circuit 706 and through a line 708 to a group of sixteen AND gates 710 in FIGURE 3*e*. This signal on line 708 gates the address from Register D through the lines 451 and the OR gates 420 into MAR–1, FIGURE 3*c*. MAR–1 now contains the beginning address of the next pulse period to be examined. Assuming that this is the second pulse period, the address in MAR–1 is approximately the location of line *b* in FIGURE 2.

The output of delay 706 is applied through a line 720 to the OR gates 422 and 424 in FIGURE 3*c*. The signal applied to OR 422 is effective, in the same manner as the signal previously described as coming from delay 416, to enter the MAR–1 address through AND gates 426 into Register C and through OR 424 to enter into MAR–1 the sum of this same address in MAR–1 plus the value in Register P. This leaves MAR–1 standing at the address (approximately line *c* in FIGURE 2) which is estimated to be the end of the next pulse period.

The output of delay 432, as described hereinbefore, is applied to delay 440 to subtract from this estimated end of pulse period address the value in Register M and to enter the difference through AND gates 452, lines 451, and OR gates 420 into MAR–1. MAR–1 now stands at the address which is the beginning of the search window $W_1'$. The output of delay 440 also is applied to delay 454 to make a comparison in circuit 470 to determine whether the Register B address is greater than the MAR–1 address. If the Register B address is greater than the MAR–1 address, the output on line 474 is applied to AND 466, deriving an output on line 477 which again resets Register Q, counter 484, FF 490, enters the MAR–1 address in Register D, and through OR 482 starts the read out and evaluation of data from memory 16 as described hereinbefore for the first pulse period.

This examination continues with each higher positive value entered into Register Q. The address of the zero crossing following the highest positive peak is gated into Register D by a gating pulse through line 600, OR 478 and line 486 to AND gates 488. When the last register in the search window has been examined, the value in counter 484 equals the Register N value and the signal on line 574 initiates the ratio comparison. If the ratio so indicates, the transfer of the just examined pulse period data from memory 16 into memory 24 is started.

The determination of successive pulse periods and the comparison of ratios and transfer or deletion of pulse periods of data continues until one of two conditions is reached. In the first condition, it is determined by the compare circuit 592, FIGURE 3*c*, that the MAR–1 address is equal to the Register B address. This indicates that the last address in which input data have been stored in memory 16 has been reached and that the read out of the data which have been transferred to memory 24 may be initiated, provided that the compare circuit 682, in FIGURE 3*h*, also indicates that the MAR–2 address equals the Register G address. This latter condition indicates that the entire allotted memory space in memory 24 has been filled, and that the desired ratio of expansion or compression has been achieved.

Assume that a comparison is made in circuit 592 indicating that MAR–1 equals Register B and an output is derived from AND gate 588 on line 594. This output is applied to an OR gate 724 in FIGURE 3*f*. The output of OR 724 on a line 726 is applied to a group of nine OR circuits 727, FIGURE 3*d*, and, through a line 728 to OR 604, FIGURE 3*g*. Note that the same signal is derived on line 726 if circuit 470, FIGURE 3*e*, indicates that Register B is not greater than MAR–1. The OR circuits 727 are similar to the OR circuits 266 and 268, in FIGURE 3*b*, and are effective to enter into Register H a maximum count which, in the binary form is all 1's.

The output of OR 604 gates the MAR–2 address into Register E whereby the Register E address and the Register F address are subtracted and gated into Register L. The Register L value is divided by the Register K value. This Register K value is the previously used value but, since Register H has been advanced to the maximum count, the former Register K value may be used without introducing any error. Also, since Register H has been advanced to its maximum value, the value entered into Register J is certain to be less than the value in Register H. Therefore, an output is derived from compare circuit 650 on the line 652 to effect transfer of the last examined pulse period of data from memory 16 to memory 24.

Each time this pulse period is transferred, the ratio of Register L to Register K is again examined and again found to be less than the Register H ratio. This last pulse period of data in memory 16 therefore is duplicated until the circuit 682 registers an indication that the MAR–2 address is equal to the Register G address. This indicates that the full allotted space in memory 24 has been filled and therefore the desired ratio of expansion or compression has been achieved. The output of circuit 682 via AND gate 678 to line 686 initiates the read out phase of operation.

Before proceeding with a description of the readout phase of operation, reference is again made to the circuit 470, FIGURE 3*e*, which compares the MAR–1 address ($W_1$) with the Register B address. If the Register B address is less, an output from AND gate 468 is applied to lines 736 and 738. The signal on line 736 passes through OR gate 724, FIGURE 3f, and line 726 to set Register H to all 1's and to initiate the comparison and transfer cycles described hereinbefore.

The signal on line 738 is applied to sixteen AND gates 740 to gate the contents of Register B into Register D. Register D now contains the address following the last address at which input data is stored in memory 16. This value is applied through lines 608 to the subtract circuit 606, FIGURE 3g, as described hereinbefore. The value in Register D is also applied to the compare circuit 696, FIGURE 3e, where it is successively compared with the MAR–1 address for use as described hereinbefore, in transferring data from memory 16 to memory 24 and for initiating a new ratio comparison each time the transfer of a pulse period of data is completed.

If a particular pulse period of data is being transferred from memory 16 to memory 24 and prior to completion of the transfer of the entire pulse period, the circuit 682 detects the condition that MAR–2 equals Register G, the transfer of data is automatically halted since an output from circuit 682 through AND gate 680 is required to initiate the next transfer cycle. When the equality condition is detected the output is not from AND gate 680 but rather from AND gate 678.

*Read Out*

The system now enters the read out phase to read from memory 24 the compressed or expanded data to record it on an output device or to feed it out as an audible sound. The output of AND gate 678, FIGURE 3h, is applied through the line 686 to a delay circuit 750. The delayed output is applied in parallel through a line 752 to the flip-flop (FF) 110 to set it to its 1 state and through a line 754 to a group of eighteen AND gates 756. The second input to the AND gates 756 via eighteen lines 640 and 757 is the address in Register F which is the starting address of the data stored in memory 24. This address is entered through lines 758 into MAR–2. The signal on line 754 also sets memory 24 to its "read" status whereby it is conditioned to read out its contents.

When the signal on line 752 sets FF 110 to its 1 state, the 1 output is applied to an AND gate 760 to gate through the 18 kc. pulses which are applied to line 176 by counter 62 in FIGURE 3a. The output of AND 760 is applied in parallel to a delay circuit 762 and to a line 764. The signal on line 764 is applied through the OR gate 668 and line 671 to the start controls of memory 24, FIGURE 3g, thereby initiating the read out of data starting with the MAR–2 address. The delayed output from circuit 762 is applied through a line 765 to a group of six AND gates 766, and, through lines 765 and 768, and OR 675, to advance MAR–2 to the next address. The second input to AND gates 766 is a group of six lines 770 which carry the data read from memory 24. This value is thus gated through gates 766 into a register 772 from which it is applied to a digital-to-analog converter 774. The analog output of circuit 774 is applied through a low pass (LP) filter circuit 776 to an audio amplifier 778. The filter 776 is utilized to eliminate the 18 kc. ripple in the output and should have an upper cutoff limit of approximately 10 kc. The output of the audio amplifier is illustrated as a speaker 780 but may be a tape recorder or any other suitable output device.

A compare circuit 782, in FIGURE 3h, has as its inputs, via lines 372 and 784, the address in Register G and via lines 290 and 786, the address in MAR–2. The address in MAR–2 advances as data are read from memory 24 until such time as the MAR–2 address equals the Register G address. At this time an output from circuit 782 is applied to a pulse generator (single-shot) 788. The output of SS 788 is applied through OR 99 to the 0 input of FF 110 to set this circuit to its 0 state and close the AND gate 760, thus stopping the memory 24 by cutting off the control pulses through line 764 and OR 668 to the memory 24. The output of SS 788 also is applied through a line 792 to a device designated 794 which signals completion of the read out of the contents of memory 24. This device 794 may be a light, bell, or other suitable device. Actuation of this device 794 signals the operator that he may now enter new audio data into memory 16.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for modifying audio data comprising, in combination,
 first storage means,
 means for recording audio input data in said first storage means,
 means for processing said recorded input data for determining, one at a time, successive periods of said data,
 means for registering the cumulative length of said determined periods of input data,
 second storage means for storing said input data in modified form,
 means operable for transferring said periods of input data selectively from said first storage means to said second storage means,
 means for registering the length of said modified data,
 means for specifying a desired ratio of modified data length to input data length,
 means operable for determining the ratio of said cumulative length to the length of modified data in said second storage means,
 means operative after each determination of a said period for operating said ratio determining means,
 means for comparing said determined ratio with said specified ratio,
 means operative, when said determined ratio is less than said specified ratio, for operating said transferring means to transfer a last determined said period of input data,
 and means operative, when said determined ratio is at least equal to said specified ratio, for initiating processing of a next succeeding period of said input data.

2. The apparatus of claim 1 including means operative after each transfer of a said period of data to said second storage means for again operating said ratio determining means.

3. The apparatus of claim 1 including means for indicating the completion of processing and transfer of said input data in accordance with said specified ratio.

4. The apparatus of claim 3 including means operable upon completion of said transfer of data to said second storage means for converting said transferred data to an audio output.

5. Apparatus for modifying speech data comprising, in combination,
 first storage means,
 means for recording speech input data in said first storage means,
 means for processing said recorded input data for determining, one at a time, successive periods thereof,
 means for registering the cumulative length of said determined periods of input data,
 second storage means for storing said input data in modified form,
 means operable for transferring said periods of input data selectively from said first storage means to said second storage means,
 means for registering the length of modified data in said second storage means,
 means for specifying a desired ratio of modified data length to input data length, means operable for determining the ratio of said cumulative length to the length of said modified data, means operative, after each determination of a said period of input data, for operating said ratio determining means, means for comparing said determined ratio with said specified ratio, means operative, when said determined ratio is less than said specified ratio, for operating said transferring means to transfer a last determined said period of input data, and means operative, when said determined ratio is at least equal to said specified ratio, for initiating processing of a next succeeding period of said data.

6. Apparatus for modifying audio data comprising, in combination, audio input means, means for converting audio input data to digital representations, first means for storing said digital representations, means operable for determining, one at a time, successive periods of said input data in said first storage means, means for registering the cumulative length of said determined periods of input data, second means for storing said digital representations in modified form, means for registering the length of said modified digital representations, means for specifying a desired ratio of modified data length to input data length, means operable for determining the ratio of said cumulative length to the length of said modified data, means operative, after each determination of a said period, for operating said ratio determining means, means for comparing said determined ratio with said specified ratio, means operative, when said determined ratio is less than said specified ratio, for transferring the last determined said period of data from said first storage means to said second storage means, and means operative, when said determined ratio is at least equal to said specified ratio for again operating said period determining means.

7. The apparatus of claim 6 wherein said audio input means includes means providing an electrical analog representation of audio input data.

8. The apparatus of claim 6 wherein said means for converting audio input data to digital representations comprises an analog-to-digital converter which includes means for sampling said electrical analog representation of said input at a fixed sample rate, and means for converting instantaneous electrical analog values to digital values.

9. The apparatus of claim 6 wherein said means for determining said periods includes filter means for detecting cycles of the fundamental frequency of said input data, and means for counting the number of cycles during a fixed period of time whereby the pitch and consequently the period are determined.

10. The apparatus of claim 6 wherein said means operable for determining successive periods of said data in said first storage means includes means for registering a period beginning point, means for adding to said beginning point the approximate length of a said period means for subtracting from said sum a predetermined length to establish a starting point to search for a period end point, means for registering a predetermined search end point, said start and end points establishing a span encompassing an actual period end, and means for examining data representations within said span for a value less than a predetermined value following a maximum value.

11. The apparatus of claim 6 wherein said means for determining successive said periods of said data in said first storage means includes a register storing a period starting address, a register storing a number equal to an approximate period length means for adding said number to said starting address to obtain an approximate period end address, a register storing a number representing a number of addresses preceding said approximate end address which are included in a span of addresses to be examined, means for subtracting last said number from said approximate period end address, a register storing a number representing the total number of addresses in said span, means for examining data at successive addresses within said span, another register initially storing a predetermined number, means for comparing successively digital data from each said address within said span with the value in said other register, means for replacing the value in said other register with the compared value each time said compared value is greater, a compare circuit for comparing digital data from each said address within said span with a preset value, a further register, means for storing in said further register the address of the first said digital data having a value less than said preset value following the replacement of a value in said other register, last said address defining an actual period end.

12. The apparatus of claim 6 wherein said means for specifying a desired ratio of modified data length to input data length includes switches for specifying said ratio in digital form.

13. The apparatus of claim 6 wherein said means for specifying a desired ratio of modified data length to input data length includes a bank of switches for setting, in digital form, a number representative of the desired length of modified data, means for determining a number representative of the actual length of said input data, means for dividing first said number by second said number, and means for storing the quotient of said division.

14. Apparatus for modifying speech input data comprising, in combination, speech input means, means for converting speech input data to digital representations, first means for storing said digital representations, means operable for determining, one at a time, successive periods of said input data in said first storage means, means for registering the cumulative length of said determined periods of input data, second means for storing said digital representations in modified form, means for specifying a desired ratio of modified data length to input data length, means operable for determining the ratio of said cumulative length to the length of said modified data, means operative after each determination of a said period for operating said ratio determining means, means for comparing said determined ratio with said specified ratio, means operative, when said determined ratio is less than said specified ratio, for transferring the last determined said period of data from said first storage means to said second storage means, and means operative, when said determined ratio is at least equal to said specified ratio, for operating said period determining means.

15. The apparatus of claim 14 including means operative after each transfer of a said period of data to said second storage means for again operating said ratio determining means.

16. The apparatus of claim 14 including means for indicating the completion of processing and transfer of said input data in accordance with said specified ratio.

17. The apparatus of claim 16 including means operable upon completion of said transfer of data to said second storage means for converting said transferred data to speech output data.

18. Apparatus for modifying speech input data comprising, in combination, an input microphone operable in response to a speech input for providing an electrical analog signal varying above and below a zero value, an analog-to-digital converter for converting said electrical analog signal, at a specified sample rate, into discrete digital data representations, a first memory for storing said digital data representations at successive memory addresses, means for determining the approximate period of said input data including, means for detecting and counting cycles of the fundamental frequency of said input data for a predetermined period of time to determine the pitch, means for determining the length in said first memory required to store said approximate period of data, means for registering said determined length, means dependent upon said determined pitch for specifying a span of addresses in said first memory to be examined in determining an actual period length, means for successively examining digital data representations from said addresses within said span and determining a maximum value, and means for successively comparing digital data representations from said addresses within said span with a predetermined value to determine a zero crossing in said data following said maximum value, said zero crossing defining an actual period end, means for registering the cumulative length of said determined periods of data a second memory for storing said digital data representations in modified form at successive addresses, means for specifying a desired ratio of modified digital data length to input digital data length, means operable for determining the ratio of said cumulative length to the length of digital data representations stored in said second memory, means operative after each determination of an actual period end for operating said ratio determining means, means for comparing said determined ratio with said specified ratio, means operative, when said determined ratio is less than said specified ratio, for transferring the last determined said period of data from said first memory to said second memory, and means operative, when said determined ratio is at least equal to said specified ratio, for again operating said actual period end determining means.

19. The apparatus of claim 18 including means operative after each transfer of a period of data to said second memory for again operating said ratio determining means.

No references cited.